(12) United States Patent
Araki et al.

(10) Patent No.: US 11,753,981 B2
(45) Date of Patent: Sep. 12, 2023

(54) PARTICULATE MATTER DETECTING APPARATUS CAPABLE OF MOUNTED CONDITION DIAGNOSIS

(71) Applicant: DENSO CORPORATION, Kariya (JP)

(72) Inventors: Takashi Araki, Kariya (JP); Masato Katsuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 274 days.

(21) Appl. No.: 17/350,151

(22) Filed: Jun. 17, 2021

(65) Prior Publication Data

US 2021/0310397 A1 Oct. 7, 2021

Related U.S. Application Data

(63) Continuation of application No. PCT/JP2019/044989, filed on Nov. 18, 2019.

(30) Foreign Application Priority Data

Dec. 20, 2018 (JP) ................................. 2018-238316

(51) Int. Cl.
  *F01N 11/00* (2006.01)
  *G01M 15/10* (2006.01)
  *F01N 13/00* (2010.01)

(52) U.S. Cl.
  CPC .......... *F01N 11/002* (2013.01); *F01N 13/008* (2013.01); *G01M 15/102* (2013.01); *F01N 2550/04* (2013.01); *F01N 2550/22* (2013.01)

(58) Field of Classification Search
  CPC ....... F01N 11/002; F01N 13/008; F02D 41/22
  See application file for complete search history.

(56) References Cited

U.S. PATENT DOCUMENTS

2012/0120981 A1* 5/2012 Genssle .............. F02D 41/1466
 73/1.06

FOREIGN PATENT DOCUMENTS

JP 2006-22730 1/2006
JP 2017-173052 9/2017

OTHER PUBLICATIONS

International Search Report dated Jan. 21, 2020 issued in International Application No. PCT/JP2019/044989 (2 pages).

* cited by examiner

*Primary Examiner* — Eric S. McCall
*Assistant Examiner* — Timothy P Graves
(74) *Attorney, Agent, or Firm* — Nixon & Vanderhye P.C.

(57) ABSTRACT

A particulate matter detecting apparatus (S) comprises a sensor body (S1) which has a sensor device (1) which is retained in a housing (H) secured to an exhaust pipe (101) of an internal combustion engine (ENG) and detects particulate matter contained in exhaust gas, a sensor temperature determining unit (2) which works to determine a temperature of the sensor device, and a mounted condition diagnosis unit (3) which diagnoses a mounted condition where the sensor body is mounted in the exhaust pipe. The mounted condition diagnosis unit includes a diagnosis threshold setting unit (31) and a mount error determining unit (32). The diagnosis threshold setting unit determines a diagnosis threshold (Tth), as used in a diagnosis of the mounted condition, as a function of an operating condition of the internal combustion engine to have a temperature value lower than a temperature of the sensor device when the sensor body is normally mounted in the exhaust pipe. When a sensor temperature (T), as determined by the sensor temperature determining unit, is lower than the diagnosis (Continued)

threshold, the mount error determining unit determines that an error in the mounted condition is occurring.

8 Claims, 18 Drawing Sheets

FIG.12
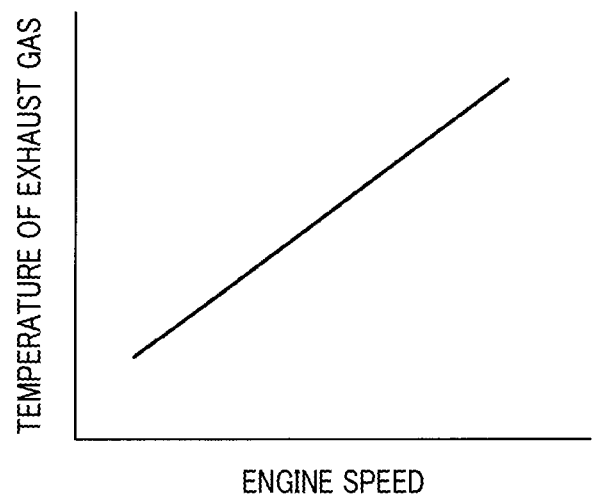
ENGINE SPEED
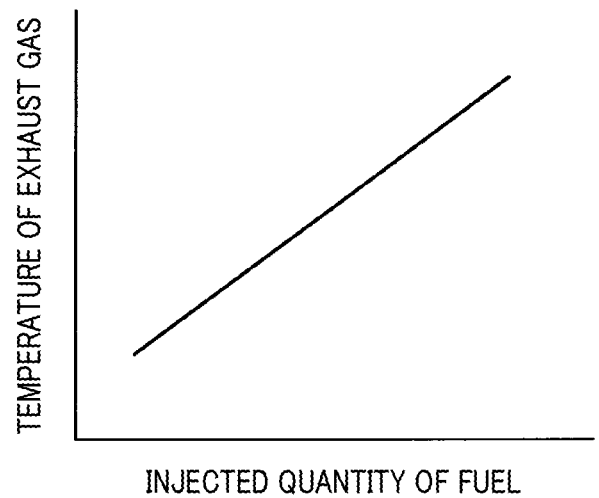
INJECTED QUANTITY OF FUEL

FIG.13
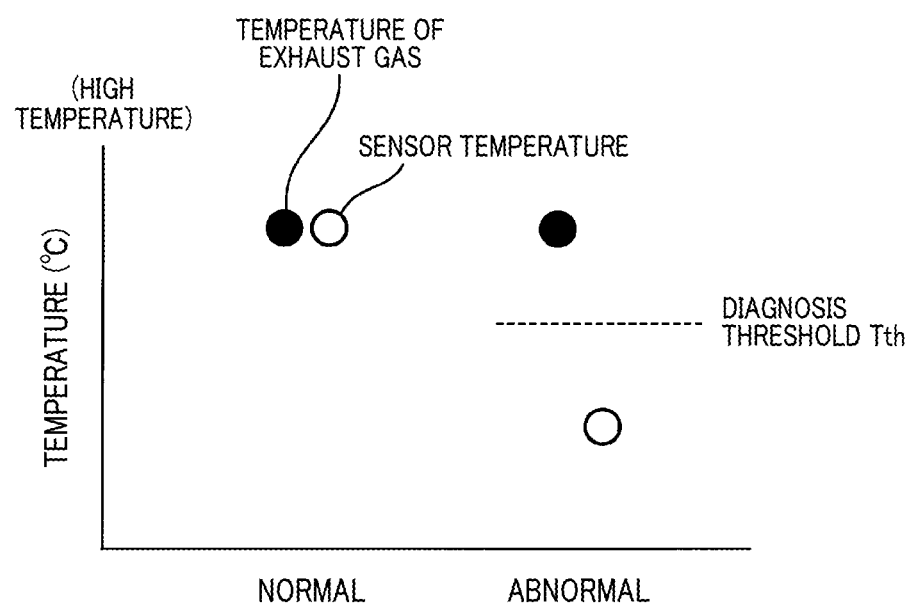
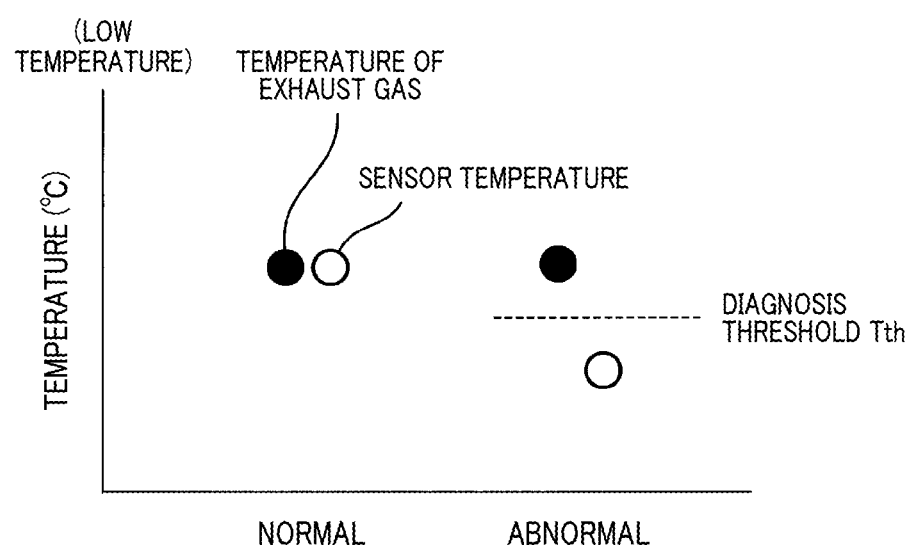

FIG.19
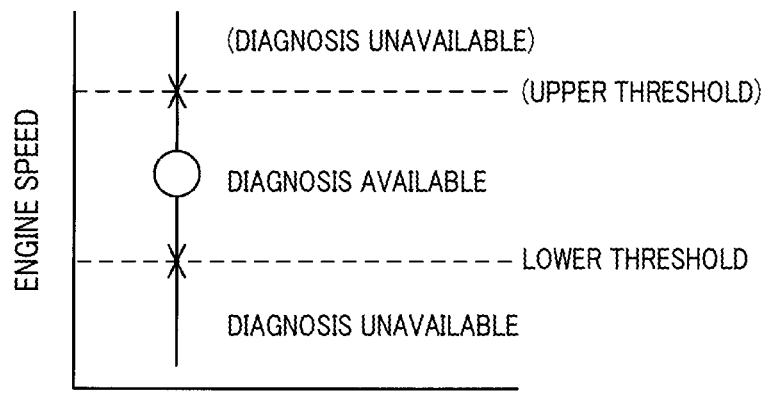
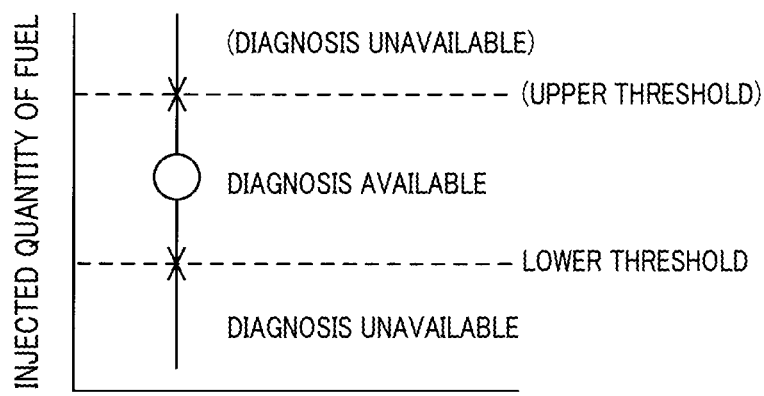

FIG.20
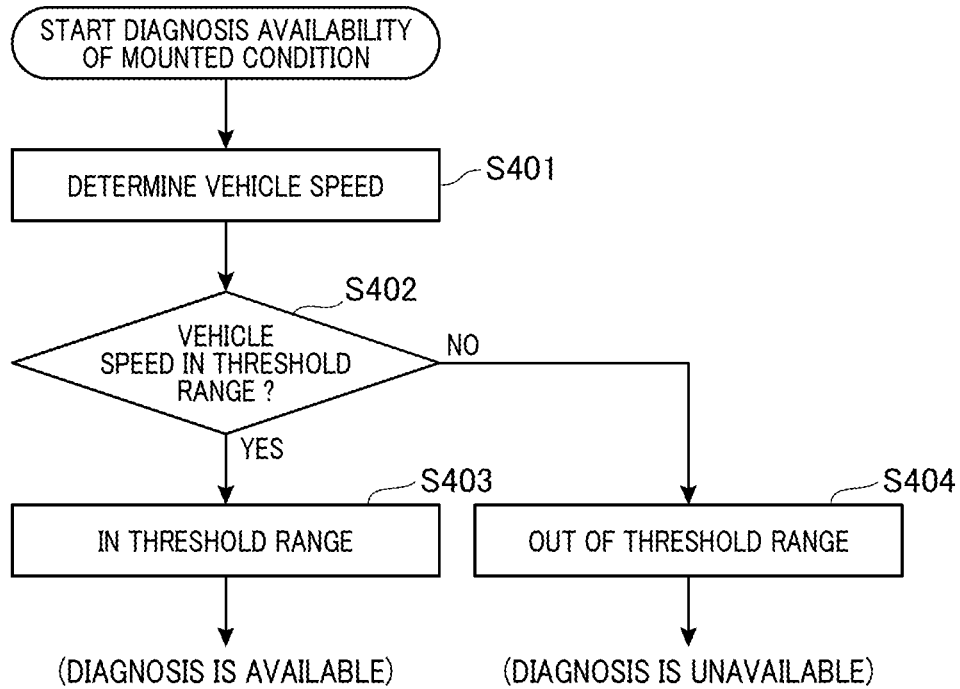
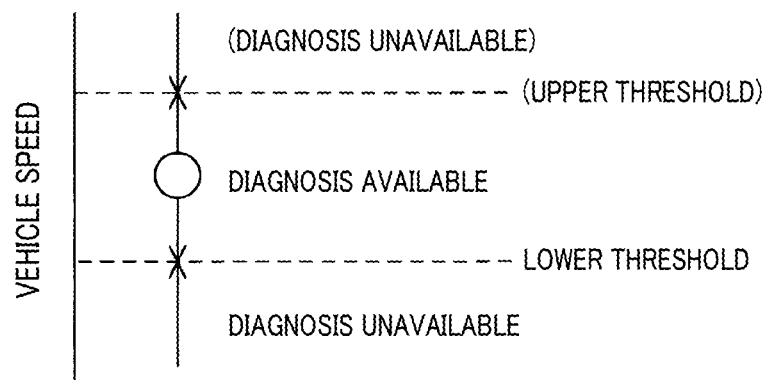

FIG.21
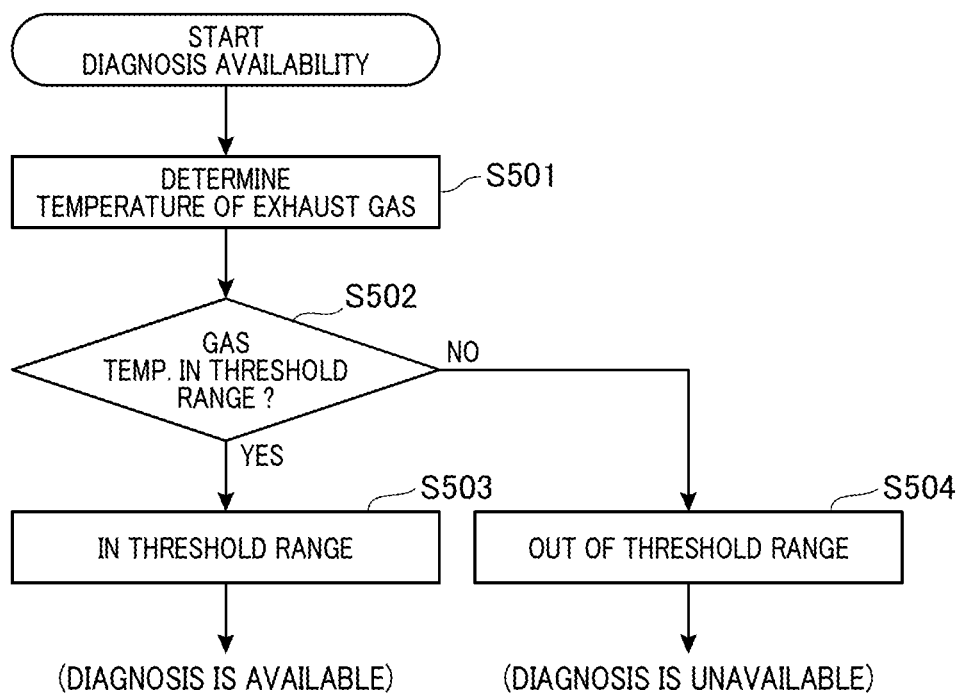
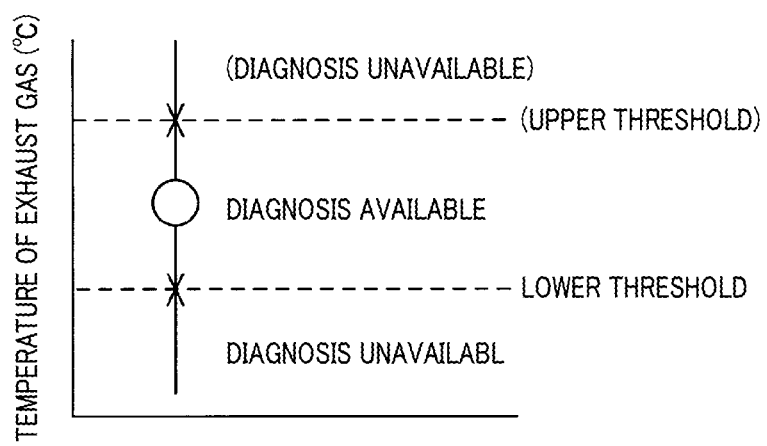

PARTICULATE MATTER DETECTING APPARATUS CAPABLE OF MOUNTED CONDITION DIAGNOSIS

CROSS REFERENCE TO RELATED DOCUMENT

This application is a continuation of international Application No. PCT/JP2019/044989 filed Nov. 18, 2019 which designated the U.S. and claims the benefit of priority of Japanese Patent Application No. 2018-238316 filed on Dec. 20, 2018, the entire contents of each of which are incorporated herein by reference.

TECHNICAL FIELD

This disclosure generally relates to a particulate matter detecting apparatus which detects particulate matter contained in exhaust gas emitted from an internal combustion engine.

BACKGROUND ART

Exhaust emission control systems are used which include a particulate filter working to capture particulate matter from exhaust gas of an engine for a vehicle. The exhaust emission control systems are equipped with a particulate matter (PM) sensor which detects particulate matter escaping out of the particulate filter when broken.

In recent years, emission control regulations have become more restrictive, thus requiring to quickly detect a malfunction of the exhaust emission control system. A failure in operation of the PM sensor may lead to an error in detecting the malfunction, thus leading to a need for detecting a malfunction of the PM sensor itself in order to ensure the reliability of operation of the exhaust emission control system. One of factors causing a decrease in function of the PM sensor is a correct mounted condition of the PM sensor. For instance, if the PM sensor is not installed properly, so that exhaust gas does not reach a sensing device installed in the PM sensor, it may result in an error in output from the PM sensor to detect the particulate matter correctly.

The above publication teaches a diagnosis method to determine a mounted condition of the PM sensor based on comparison between the temperature of the PM sensor, as measured directly or indirectly by a sensor unit in which the PM sensor is installed, and the temperature of exhaust gas measured by another sensor unit. Usually, a change in temperature of the PM sensor follows a change in temperature of the exhaust gas. Accordingly, when the temperature of the PM sensor drops while the temperature of the exhaust gas is rising, and a difference therebetween becomes large, there is a risk that an abnormality may occur in the PM sensor.

PRIOR ART LITERATURE

Patent Literature

Patent literature 1: DE102009003091 A1

SUMMARY OF THE INVENTION

The above method of comparing the temperature of the PM sensor and the temperature of exhaust gas, as taught in Patent literature 1, needs sensors to measure such temperatures or a means for calculating them. The relation between the temperature of the PM sensor and the temperature of exhaust gas depends upon an operating condition of the vehicle as well as the type of the vehicle, the structure of the exhaust emission control system, or the mounted location of the PM sensor. The system, as taught in the above publication, is designed to obtain a temperature profile representing the relation between the temperature of the PM sensor and the temperature of exhaust gas to compare between rates of change in such temperatures to diagnose the abnormality of the PM sensor. It, therefore, requires time to complete such a diagnosis and may lead to an error in diagnosing the mounted condition of the PM sensor.

It is an object of this disclosure to provide a particulate matter detecting apparatus which is capable of diagnosing a mounted condition of a sensor device to have an increased degree of reliability in operation thereof.

According to one aspect of this disclosure, there is provided a particulate matter detecting apparatus which comprises: (a) a sensor body which has a sensor device which is retained in a housing configured to be secured to an exhaust pipe of an internal combustion engine and detects particulate matter contained in exhaust gas; (b) a sensor temperature determining unit which works to determine a temperature of the sensor device; and (c) a mounted condition diagnosis unit which diagnoses a mounted condition where the sensor body is mounted in the exhaust pipe. The mounted condition diagnosis unit includes a diagnosis threshold setting unit and a mount error determining unit. The diagnosis threshold setting unit determines a diagnosis threshold, as used in a diagnosis of the mounted condition, as a function of an operating condition of the internal combustion engine to have a temperature value lower than a temperature of the sensor device when the sensor body is normally mounted in the exhaust pipe. The mount error determining unit compares a sensor temperature that is the temperature of the sensor device determined by the sensor temperature determining unit with the diagnosis threshold and, when the sensor temperature is lower than the diagnosis threshold, determines that an error in the mounted condition is occurring.

The mounted condition diagnosis unit of the particulate matter detecting apparatus is equipped with the diagnosis threshold setting unit which sets the diagnosis threshold for use in diagnosing the mounted condition of the sensor device. When the sensor body is normally mounted, the temperature of the sensor device measured by the sensor temperature determining unit is substantially equal to the temperature of the exhaust gas in the exhaust pipe. The temperature of exhaust gas may be calculated using the operating condition, thereby enabling the diagnosis of the mounted condition to be achieved by deriving a relation between the operating condition, the temperature of exhaust gas, and the temperature of the sensor device in advance and then setting the threshold value to be lower than the temperature of the sensor device in the normally mounted condition.

The above arrangements eliminate the need for a means for directly measuring or calculating the temperature of exhaust gas or deriving a profile representing the relation between the temperature of the sensor device and the temperature of exhaust gas for comparison therebetween. The accurate determination of the availability of the diagnosis of the mounted condition is, therefore, achieved by determining the threshold value as a function of the current operating condition.

The particulate matter detecting apparatus in the above mode is, as apparent from the above discussion, capable of diagnosing the mounted condition of the sensor device with high accuracy and having a high degree of reliability of operation thereof.

BRIEF DESCRIPTION OF THE DRAWINGS

The above or other objects, features, or beneficial advantages of this disclosure will be understood more fully from the detailed description given hereinbelow and from the accompanying drawings.

FIG. 12 is a view which represents a relation among an engine speed, an injected quantity of fuel, and a temperature of exhaust gas for use in a diagnosis threshold setting unit of a mounted condition diagnosis unit in the first embodiment.

FIG. 13 is a view which represents an example of how to determine a diagnosis threshold Tth between a high temperature condition and a low temperature condition for use in a mounted condition diagnosis unit in the first embodiment.

FIG. 19 is a view which represents relations between a diagnosis availability range and a threshold value in terms of an engine speed and an injected quantity of fuel for use in a diagnosis availability determining unit of a mounted condition diagnosis unit according to the fourth embodiment.

FIG. 20 is a view which represents a flow chart of a diagnosis availability determining operation performed by a diagnosis availability determining unit of a mounted condition diagnosis unit and a relation between a diagnosis availability range in terms of a vehicle speed and a threshold in a modification of the fourth embodiment.

FIG. 21 is a view which represents a flow chart of a diagnosis availability determining operation performed by a diagnosis availability determining unit of a mounted condition diagnosis unit and a relation between a diagnosis availability range in terms of a temperature of exhaust gas and a threshold in a modification of the fourth embodiment.

EMBODIMENTS FOR CARRYING OUT THE INVENTION

First Embodiment

Figure 1:
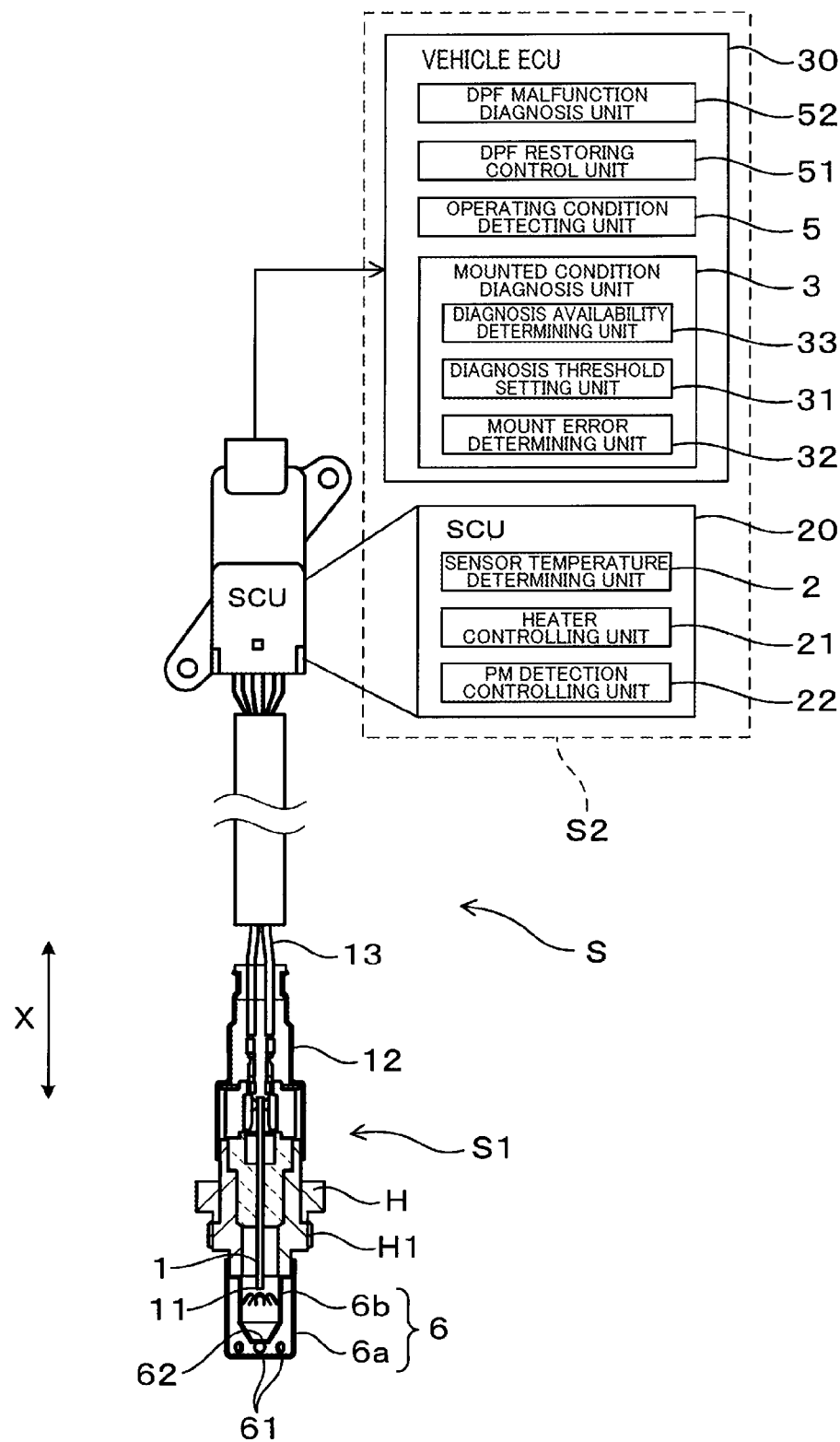
FIG. 1 is a view which illustrates an overall structure of a particular matter detecting apparatus according to the first embodiment.
Figure 2:
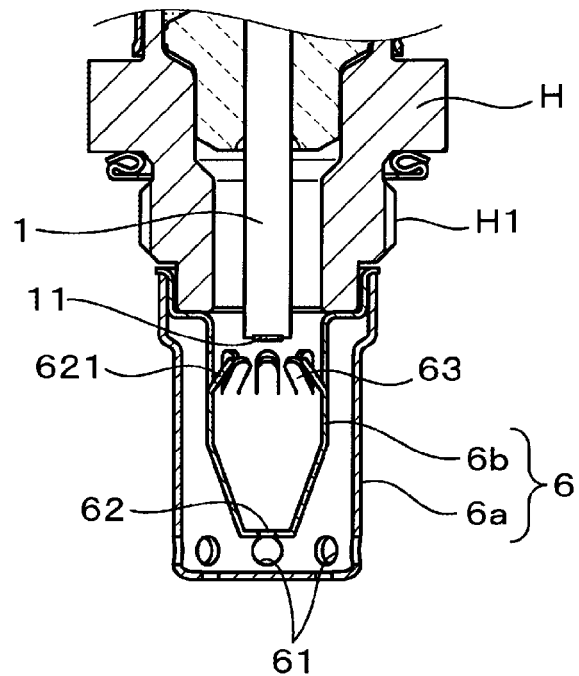
FIG. 2 is an enlarged sectional view which illustrates highlights of a sensor body of a particulate matter detecting apparatus in the first embodiment.
Figure 3:
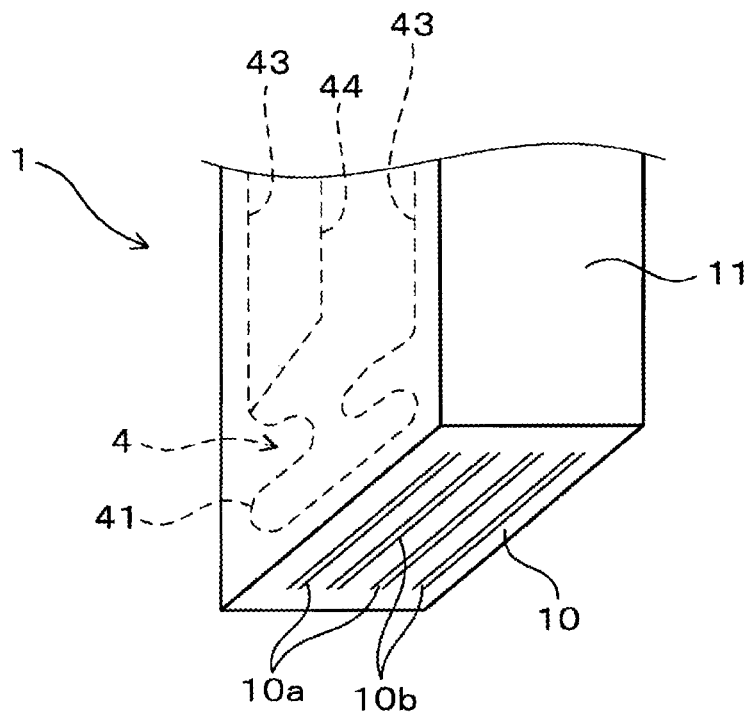
FIG. 3 is an enlarged perspective view which illustrates highlights of a sensor device of a particulate matter detecting apparatus in the first embodiment.
Figure 4:
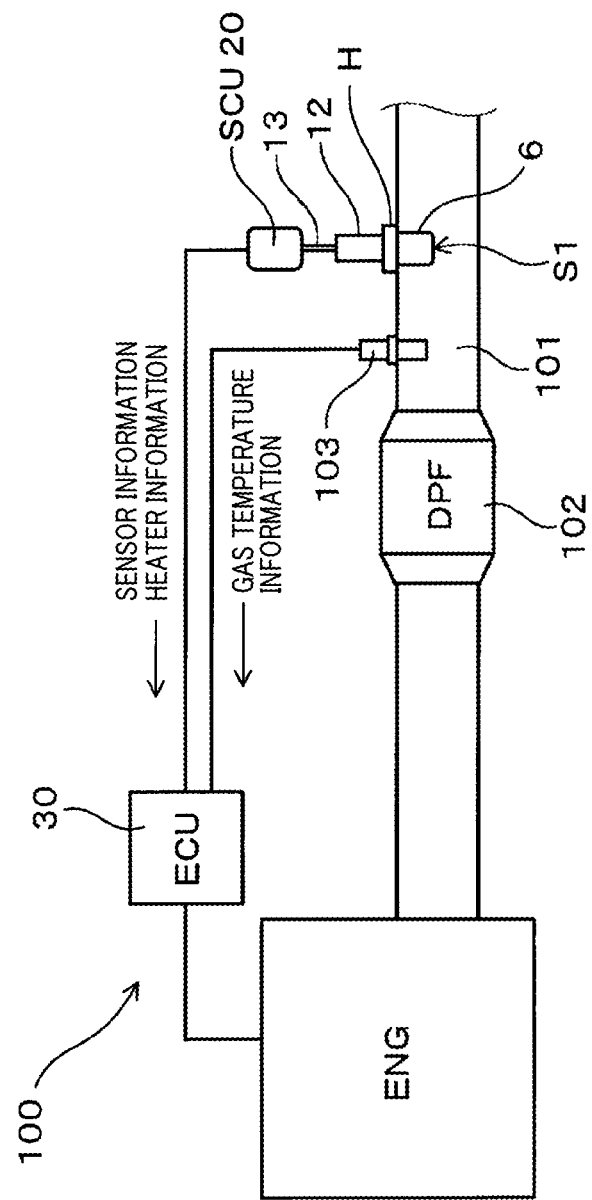
FIG. 4 is a view which illustrates an overall structure of an exhaust emission control system including a particulate matter detecting apparatus in the first embodiment.

The particulate matter detecting apparatus S in this embodiment will be described below with reference FIGS. 1 to 14. The particulate matter detecting apparatus S, as illustrated in FIGS. 1 to 3, includes the sensor body S1 equipped with the sensor device 1 and the controller S2 equipped with the sensor temperature determining unit 2 and the mounted condition diagnosis unit 3. The particulate matter detecting apparatus S may be, as illustrated in FIG. 4, used with the emission control device 100 mounted on a diesel engine ENG that is an internal combustion engine for vehicles (which will also be referred to as an engine). The sensor body S1 is equipped with the housing H which is attached to the exhaust pipe 101 of the engine ENG and has disposed therein the sensor device 1 serving to detect particulate matter contained in exhaust gas.

The controller S2 is equipped with the sensor temperature determining unit 2 which is installed in the sensor control unit (SCU) 20 connecting with the sensor body S1 and works to measure the temperature of the sensor device 1. The electronic control unit (ECU) 30 installed in the vehicle is equipped with the mounted condition diagnosis unit 3 which diagnoses a condition of the sensor body S1 mounted in the exhaust pipe 101.

The mounted condition diagnosis unit 3 includes the diagnosis threshold setting unit 31 and the mount error determining unit 32. The diagnosis threshold setting unit 31 sets the diagnosis threshold Tth. The mount error determining unit 32 determines whether there is an error in mounting of the sensor body S1. The diagnosis threshold setting unit 31 uses an operating condition of the engine NEG to set the diagnosis threshold Tth for use in diagnosing the mounted condition to a temperature value lower than a temperature of the sensor device 1 when the sensor body S1 is properly or normally mounted in the exhaust pipe 101. The mount error determining unit 32 compares the sensor temperature T, as determined by the sensor temperature determining unit 2, with the diagnosis threshold Tth and determines that the mounted condition is abnormal, that is, an error in mounting of the sensor body S1 is occurring when the sensor temperature T is lower than the diagnosis threshold Tth (i.e., T<Tth).

Specifically, the engine speed or injected quantity of fuel may be used as information about an operating condition of the engine ENG (which will also be referred to below as operating information). The diagnosis threshold setting unit 31 is capable of measuring at least one of the engine speed and the injected quantity of fuel to determine the diagnosis threshold Tth to have a value lower than a temperature of the sensor device 1 which meets a relation between the temperature of the sensor device 1 and the one of the engine speed and the injected quantity of fuel which is established when the sensor body S1 is properly mounted (i.e., normally mounted condition).

The sensor body S1 is equipped with the heater 4 (see FIG. 3) which is, for example, electrically energized to generate thermal energy to increase the temperature of the sensor device 1. The sensor temperature determining unit 2 is capable of determining the sensor temperature T as a function of a resistance value of the heater 4. The controller S2 is also equipped with the heater controlling unit 21 which works to control an operating of the heater 4 to heat up the heater 4.

The mounted condition diagnosis unit 3 is preferably quipped with the diagnosis availability determining unit 33 which determines whether a correct diagnosis of the mounted condition of the sensor body S1 is available. Specifically, the diagnosis availability determining unit 33 is capable of determining whether the correct diagnosis is available using information about at least one of an operating condition of the sensor temperature determining unit 2, a controlled condition of the sensor device 1, a condition of exhaust gas in the exhaust pipe 101, and an operating condition of the engine ENG.

The structure of the particulate matter detecting apparatus S will be described below in detail.

In FIG. 1, the sensor body S1 of the particulate matter detecting apparatus S includes the cylindrical housing H and the attachment screw H1. The sensor body S1 has the sensor device S1 disposed inside the housing H coaxially therewith. The attachment screw H1 is arranged on an outer circumference of the housing H to attach the sensor body S1 to the exhaust pipe 101. The housing H has opened ends and has the container-shaped device cover 6 secured to the front end thereof. The housing H also has the cylindrical air cover 12 secured to the base end thereof.

In the following discussion, a vertical direction, as viewed in FIG. 1, will also be referred to as an axial direction X of the sensor body S1. A lower end side of the sensor body S1 will also be referred to as a front end side. An upper end side of the sensor body S1 will also be referred to as a base end side.

The sensor device 1 is of an elongated rectangular parallelepiped shape and extends in the axial direction X of the sensor body S1. The sensor device 1 is equipped with the sensitive portion 10 which is disposed on the front end thereof and works to detect particulate matter contained in exhaust gas emitted from the engine ENG. The sensor device 1 has opposed ends which protrude outside the housing H and also has the front end side including the sensitive portion 10 covered with the device cover 6. The device cover 6 (which will be described later in detail) protects the sensor device 1 from poisons or condensed water in the exhaust gas.

The sensor body S1 is, as illustrated in FIG. 4, installed in the exhaust pipe 101 of the emission control device 100. The securement of the housing H of the sensor body S1 is achieved by inserting the housing H into a mount hole formed in the exhaust pipe 101 and threadedly fastening the attachment screw H1 thereto, so that the front end side of the sensor device 1 covered with the device cover 6 protrudes inside the exhaust pipe 101. The air cover 12 covers the base end side of the sensor device 1 located outside the exhaust pipe 101. The sensor device 1 and the SCU 20 are electrically connected together using the leads 13 extending from the base end side of the air cover 12.

The sensor device 1, as illustrated in FIGS. 2 and 3 as an example, is implemented by a stacked device having a stacked structure and has the flattened rectangular parallelepiped insulating base 11 whose front end surface defines the sensitive portion 10. The sensitive portion 10 has mounted thereon a plurality of linear electrodes including the sensing electrodes 10a and 10b which define a plurality of electrode pairs different in polarity from each other. The sensitive portion 10 is produced, for example, by preparing a stack made up of a plurality of insulating sheets which will become the insulating base 11 and electrode layers which will become the sensing electrodes 10a and 10b and are interposed between a respective two of the insulating sheets and then firing the stack. The electrode layers are at least partially embedded in the insulating base 11 to have edges exposed outside the front end surface of the insulating base 11 in the form of lines defining the sensing electrodes 10a and 10b. The insulating base 11 is made of, for example, an insulating ceramic material, such as alumina.

The insulating base 11 has embedded therein leads, not shown, which are connected to the sensing electrodes 10a and 10b. The leads extend to the base end side of the sensor device 1 and connect with the PM detection controlling unit 22 of the SCU 20 (see FIG. 1). The PM detection controlling unit 22 is equipped with a voltage applying circuit working to apply PM detecting voltage to the sensing electrodes 10a and 10b to electrostatically collect PM between the sensing electrodes 10a and 10b for a given period of time.

Figure 5:
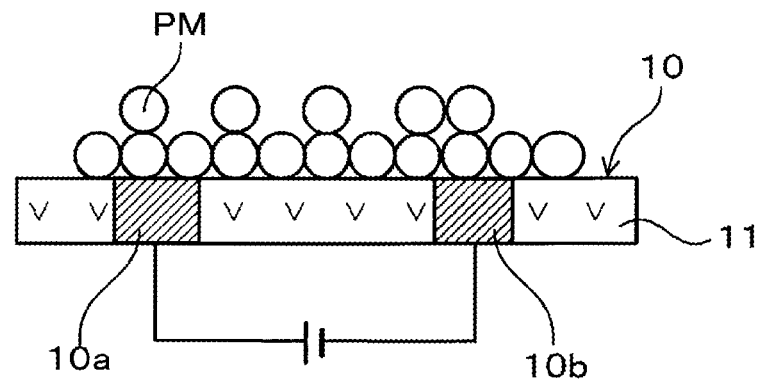
FIG. 5 is a schematic cross section for explaining an operation of a sensor device in the first embodiment.

Principles for detecting PM will be described below with reference to a schematic view of FIG. 5. The sensitive portion 10 of the sensor device 1 has the sensing electrodes 10a and 10b which are arranged at a given interval away from each other and face each other on the surface of the sensitive portion 10. In an initial state, the sensing electrodes 10a and 10b are not electrically energized. When a PM detection period is entered, the PM detection controlling unit 22 applies a given voltage to the sensing electrodes 10a and 10b to develop an electrical field therebetween, thereby attracting PM. The PM is then gradually accumulated on the sensing electrodes 10a and 10b and finally electrically connects the sensing electrodes 10a and 10b together. This causes the resistance value of the sensing electrodes 10a and 10b to be changed as a function of a collected quantity of the PM. The PM detection controlling unit 22 then measures electrical current flowing between the sensing electrodes 10a and 10b.

Referring to FIG. 3, the insulating base 11 has a heater electrode, a pair of leads 42 and 43, and the sensing lead 44 embedded in a portion near the front end surface on which the sensing electrodes 10a and 10b are formed. The heater electrode constitutes the heat generating portion 41 of the heater 4. The leads 42 and 43 are used to electrically energize the heat generating portion 41. The leads 42, 43, and 44 extend to the base end side of the sensor device 1 and connect with the heater controlling unit 21 of the SCU 30 through the leads 13 (see FIG. 1).

The heater controlling unit 21 is equipped with, for example, a pulse-width modulation circuit working to control a pulse width of a heater drive signal and serves to control the degree of electrical energization of the heat generating portion 41 using a duty factor (which will also be referred to as a heater duty (heater Duty) of the pulse signal. Therefore, the heater controlling unit 21 controls the quantity of heat generated by the heater 4 to heat the sensor device 1 up to a given temperature. For instance, when it is required for the PM detection controlling unit 22 to detect PM, a sensor recovery operation may be first performed to heat the sensitive portion 10 over a temperature at which PM is usually burned to burn away PM collected on the sensor device 1, thereby restoring or regenerating the sensor device 1 into the initial condition thereof.

Figure 6:
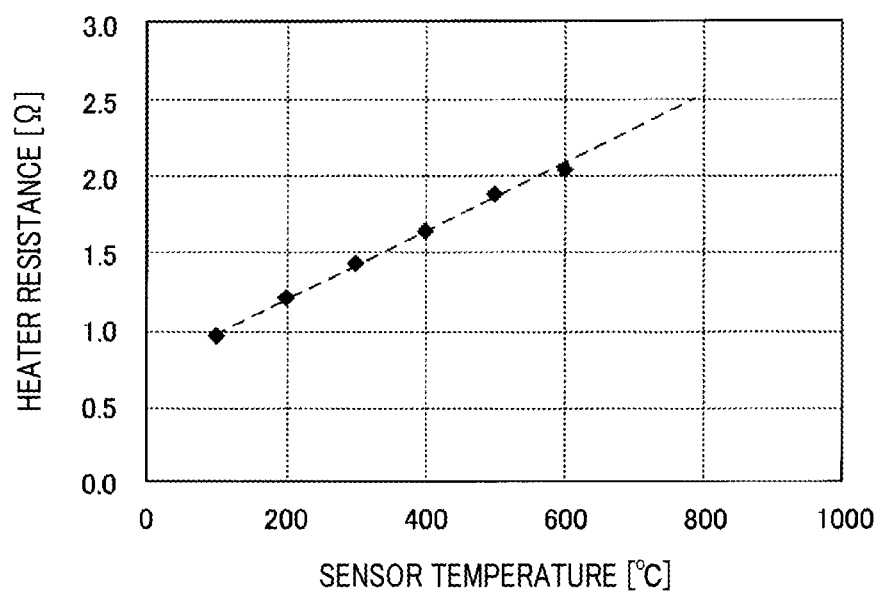
FIG. 6 is a view which represents a relation between a heater resistance and a sensor temperature for use in a sensor temperature determining unit of a particulate matter detecting apparatus in the first embodiment.

In this embodiment, the sensor temperature determining unit 2 uses a resistance value (which will also be referred to as a heater resistance) of the heat generating portion 41 of the heater 4 built in the sensor device 1 to determine the sensor temperature T. Specifically, the sensor temperature T is, as can be seen in FIG. 6, proportional to the heater resistance. It is, therefore, possible to use such a proportional relation to determine the sensor temperature T. The sensor temperature determining unit 2 is, therefore, equipped with a heater resistance measuring circuit, not shown, which measures an electrical current which flows in the heating generating portion 41 of the heater 4 upon application of voltage to the heating generating portion 41 through the sensing lead 44 and then calculates the heater resistance (i.e., the heater resistance=applied voltage/measured current).

The device cover 6 is in the shape of a double-walled container having an opening facing the housing H and made up of the outer cover 6a and the inner cover 6b arranged coaxially with each other. The outer cover 6a is made of a cylinder whose diameter is substantially constant and a front end surface closing an end of the cylinder. The outer cover 6a also has a plurality of gas flow through-holes 61 which are formed in a peripheral surface thereof close to the front end surface and through which exhaust gas flowing in the exhaust pipe 101 enters inside the outer cover 6a. The inner cover 6b has the gas flow through-hole 62 which is formed in the front end surface thereof and communicates between an inner space of the inner cover 6b and an inner space of the outer cover 6a.

The inner cover 6b has a plurality of gas flow through-holes 621 formed in a side surface close to the base end side thereof. The guides 63 are disposed in the gas flow through-holes 621. The guides 63 slant inwardly in the inner cover 6b. The exhaust gas, as having entered the outer cover 6a, is directed along the outer surface of the inner cover 6b toward the base end side and then introduced inside the inner cover 6b through the gas flow through-holes 621. The guides 63 have front ends facing the sensitive portion 2 of the sensor device 1 which is located on an axis of the inner cover 6b and serve to orient the exhaust gas, as having entered the inner cover 6b, toward the sensitive portion 10, which is, in turn, discharged through the gas flow through-hole 62 in the front end surface and joints a flow of exhaust gas emerging from inside to outside the outer cover 6a.

The gas flow through-holes 61 and 62 of the outer cover 6a and the inner cover 6b close to the front end sides thereof are, for example, circular. The gas flow through-holes 621 of the inner cover 6b close to the base end side thereof are elongated in the axial direction X are formed integrally with the plate-like guides 63 made by cutting the side surface of the inner cover 6b. The configurations of the outer cover 6a, the inner cover 6b, and the gas flow through-holes 61, 62, and 621 are not limited to the above, but may be optionally changed. The guides 63 may be omitted from the gas flow through-holes 621. The number or layout of the gas flow through-holes 61, 62, and 621 may be optionally changed. It is, however, advisable that the gas flow through-holes 61 and 621 be arranged at equal intervals away from each other in the entire circumferential surfaces of the outer cover 6a and the inner cover 6b, thereby causing the outer cover 6a and the inner cover 6b to have no directivity to a gas flow.

The particulate matter detecting apparatus S in this embodiment, as illustrated in FIG. 4, has the sensor body S1 installed in the wall of the exhaust pipe 101 downstream of the diesel particulate filter 102 (which will also be referred to below as DPF) constituting the emission control device 100. The sensor body S1 has a front half thereof exposed inside the exhaust pipe 101. The sensitive portion 10 of the sensor device 1 arranged inside the device cover 6 is activated by a command from the PM detection controlling unit 22 of the SCU 20 to detect particulate matter escaping from the DPF 102. In response to a command from the sensor temperature determining unit 2, a signal detecting the sensor temperature T as a function of the heater resistance of the heater 4 of the sensor device 1 is outputted to the SCU 20.

The temperature sensor 103 is installed in the exhaust pipe 101 between the DPF 102 and the sensor body S1 to measure the temperature of gas in the exhaust pipe 101 downstream of the DPF 102. A measurement signal is outputted from the temperature sensor 103 to the ECU 30 as representing information about the temperature of gas. In addition to the exhaust gas information about the gas temperature from the temperature sensor 103, sensor information and heater information is also outputted from the SCU 20 to the ECU 30. The ECU 30 analyzes such information to perform a diagnosis of malfunction of the DPF 102 and a diagnosis of a mounted condition of the sensor body S1.

The ECU 30 is equipped with the operating condition detecting unit 5 which detects an operating condition of the engine ENG. A quantity of intake air, as measured by, for example, an air flow meter, not shown, and measurement information produced by an engine speed sensor, an accelerator position sensor, a vehicle speed sensor, and an ambient temperature sensor are inputted to the operating condition detecting unit 5. The ECU 30 determines an injected quantity of fuel and an injection timing using the information inputted into the operating condition detecting unit 5 to bring the engine ENG into an optimum operating condition and controls the whole of the vehicle using such operating information.

The ECU 30 is also equipped with the DPF restoring control unit 51 and the DPF malfunction diagnosis unit 52 (see FIG. 1). The DPF restoring control unit 51 works to control restoring of the DPF 102. The DFP malfunction diagnosis unit 52 works to diagnose a malfunction of the DPF 102. The DPF restoring control unit 51 determines whether the DPF 102 is required to be restored using, for example, an operating condition of the vehicle. The DPF malfunction diagnosis unit 52 analyzes, for example, PM detection information to determine whether a malfunction of the DPF 102 has occurred arising from, for example, breakage thereof.

The gas temperature may be determined by a value measured by the temperature sensor 103 or a value calculated as a function of an operating condition of the engine ENG. The exhaust gas information includes, in addition to the gas temperature, information about a quantity of gas flowing in the exhaust pipe 101 and restoring information about the DPF 102. The engine ENG is not limited to a diesel engine, but however, may alternatively be implemented by a gasoline engine. In such a case, a gasoline particulate filter (which will also be referred to as GPF) is used instead of the DPF 102.

Next, the mounted condition diagnosis unit 3 of the ECU 30 will be described below in detail.

The particulate matter detecting apparatus S mainly uses the PM detection information, as outputted from the PM detection controlling unit 22 of the SCU 20, in diagnosing the malfunction of the DPF 102 in the DPF malfunction diagnosis unit 52 of the ECU 30. In order to secure the stability in diagnosis of the malfunction of the DPF 102, it is necessary for the sensor device 1 to properly detect PM. To this end, it is essential to dispose the sensor body S1 including the sensor device 1 in the correct place.

For instance, when the sensor body S1 is removed from the exhaust pipe 101 intentionally for some reason or in error, and the engine ENG has been started, it will cause no exhaust gas to reach the sensor device 1. In such an event, even if the DPF 102 is malfunctioning, the sensor device 1 will output no PM detection signal, which results in no diagnosis of the malfunction or no alert to a vehicle occupant. This leads to a risk that the particulate matter may be emitted outside the vehicle. Similarly, when the sensor body S1 is improperly mounted in the exhaust pipe 101 or placed in improper orientation, thereby resulting in a failure in flowing a required quantity of exhaust gas into the device cover 6, it will cause the sensor device 1 to output a signal including an error, which may lead to a failure in detecting the PM.

The particulate matter detecting apparatus S is equipped with the mounted condition diagnosis unit 3 which is capable of diagnosing the mounted condition of the sensor body S1 (which will also be referred to as mounted-condition diagnosis). The mounted-condition diagnosis is made using the sensor temperature information about the sensor body S1. The mount error determining unit 32 compares a measured value of the sensor temperature T determined by the sensor temperature determining unit 2 with the diagnosis threshold Tth to determine whether there is an error in the mounted condition. The diagnosis threshold Tth for use in the mounted-condition diagnosis is determined by the diagnosis threshold setting unit 31 as a function of an operating condition of the engine ENG at the time of the diagnosis.

The highly reliable comparison using the diagnosis threshold Tth requires a variety of conditions at the time of the diagnosis to be suitable for the mounted-condition diagnosis. To this end, the mounted condition diagnosis unit 3 is equipped with the diagnosis availability determining unit 33 to determine whether the mounted-condition diagnosis is properly available prior to the diagnosis of the mounted condition using the sensor temperature information. A sequence of steps for the above determination performed by the mounted condition diagnosis unit 3 will be described below with reference to FIG. 7. Steps S1 and S2 correspond to operations of the diagnosis availability determining unit 3 of the mounted condition diagnosis unit 3. Steps S3 and S4 correspond to operations of the diagnosis threshold setting unit 31. Steps S5 to S7 correspond to operations of the mount error determining unit 32.

Figure 7:
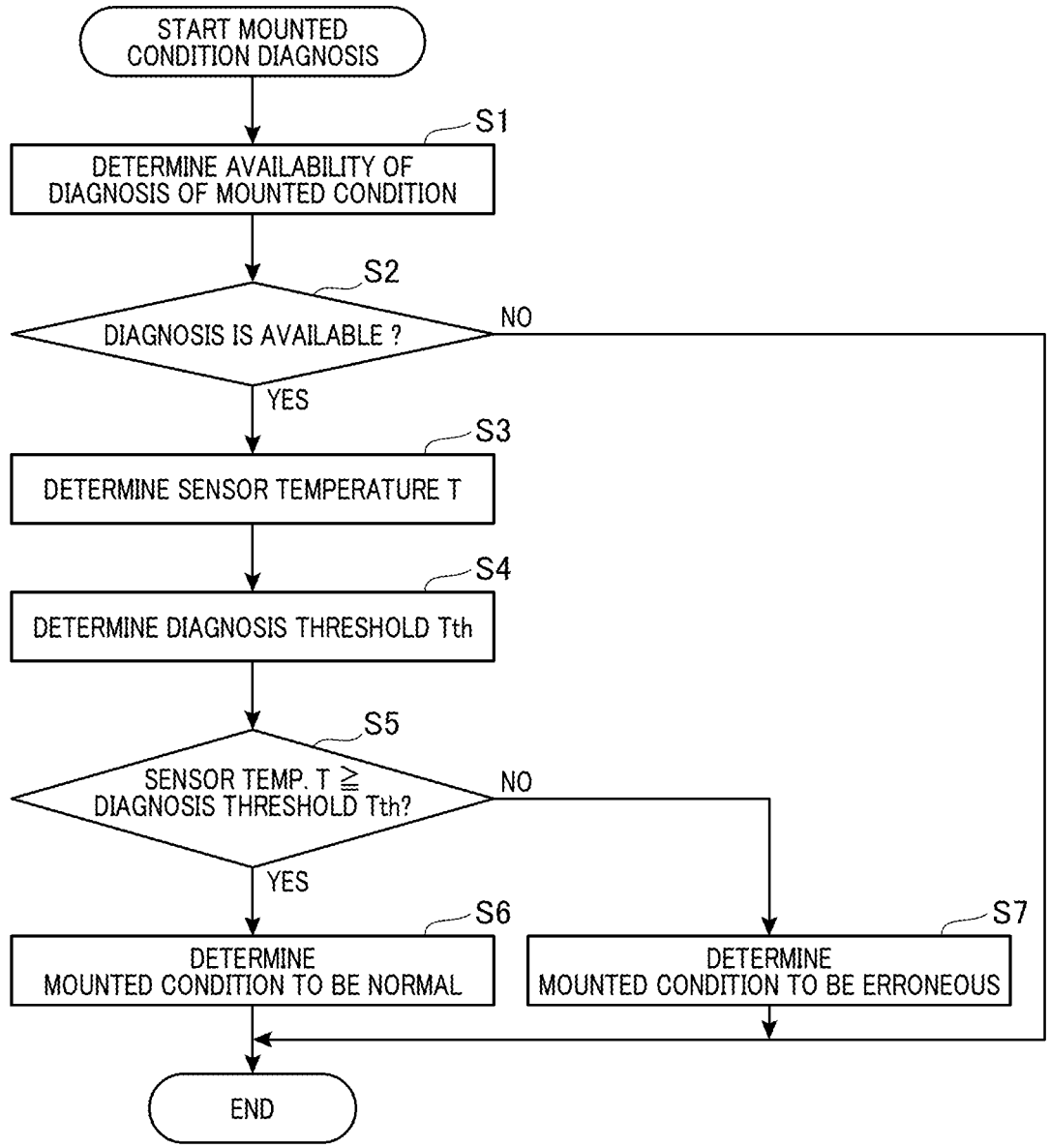
FIG. 7 is a flowchart of a mounted condition diagnosis performed by a mounted condition diagnosis unit of a particulate matter detecting apparatus in the first embodiment.

In FIG. 7, upon start of the mounted-condition diagnosis, the routine proceeds to step S1 wherein a determination of availability of a diagnosis of the mounted condition of the sensor body S1 is made. Such a determination is made, for example, in a sequence of steps illustrated in FIG. 8. After starting the diagnosis availability determination in step S1, the routine proceeds to step S11 in FIG. 8 wherein the heater resistance is detected as one of pieces of information about operations of the sensor temperature determining unit 2. The routine proceeds to step S12 wherein the heater resistance, as derived in step S11, is compared with given resistance threshold values Rth1 and Rth2.

Figure 9:
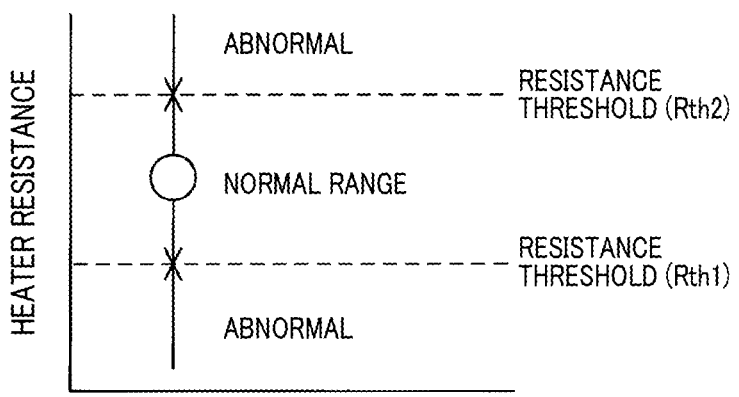
FIG. 9 is a view which represent a relation between a normal range of a heater resistance and a resistance threshold for use in a diagnosis availability determining unit of a mounted condition diagnosis unit in the first embodiment.

The value of the heater resistance measured by the heater resistance measuring circuit is, as illustrated in FIG. 9, adjusted to fall in a given normal range defined by a lower limit that is the resistance threshold value Rth1 and an upper limit that is the resistance threshold value Rth2. The mounted-condition diagnosis can, therefore, be properly performed in the following steps by determining whether the value of the heater resistance lies in the normal range in which the sensor temperature determining unit 2 operates properly.

For instance, when the value of the heater resistance is equal to or below the lower resistance threshold value Rth1, it will cause the sensor temperature T calculated as a function of the heater resistance to be lower than actual. This leads to a risk that the sensor body S1 may be determined not to be mounted in the exhaust pipe 101 even though the sensor body S1 is properly mounted in the exhaust pipe 101. Conversely, when the value of the heater resistance is equal to or higher than the upper resistance threshold value Rth2, it will cause the sensor temperature T to be higher than actual. This leads to a risk that the sensor body S1 may be determined to be properly mounted in the exhaust pipe 101 even though the sensor body S1 is actually not mounted in the exhaust pipe 101.

In step S12, it is determined whether the measured value of the heater resistance lies in a range from the resistance threshold value Rth1 to the resistance threshold value Rth2 (i.e., Rth1<heater resistance<Rth2?). If a YES answer is obtained in step S12, then the routine proceeds to step S13 wherein the heater resistance is determined to be a proper value meaning that the heater 4 and the sensor temperature determining unit 2 are properly operating, thus enabling the diagnosis of the mounted condition to be properly performed using the sensor temperature T determined as a function of the heater resistance. Alternatively, if a NO answer is obtained in step S12, then the routine proceeds to step S14 wherein it is determined that the value of the heater resistance is incorrect meaning that the heater 4 or the sensor temperature determining unit 2 is malfunctioning, so that it is determined that it is impossible to correctly perform the diagnosis of the mounted condition using the sensor temperature T calculated as a function of the heater resistance.

Figure 8:
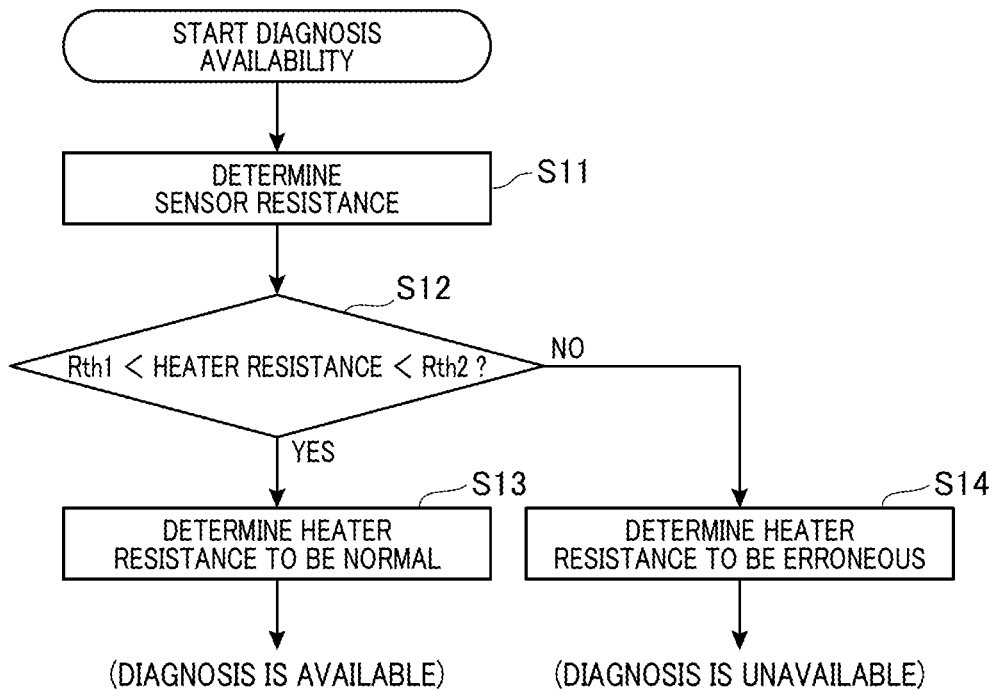
FIG. 8 is a flowchart of a diagnosis availability determining operation performed by a diagnosis availability determining unit of a mounted condition diagnosis unit in the first embodiment.

Referring back to FIG. 7, in step S2, it is determined whether the diagnosis of the mounted condition is properly available using the determination in step S13 or S14 in FIG. 8. If a YES answer is obtained in step S2, then the routine proceeds to step S3 wherein the mounted-condition diagnosis continues to be performed. Alternatively, if a NO answer is obtained meaning that the mounted-condition diagnosis is not properly available. The routine then terminates.

In step S3, the sensor temperature determining unit 2 of the SCU 20 determines the sensor temperature T. The diagnosis availability determination in step S1 uses the heater resistance measured by the sensor temperature determining unit 2. By storing a map listing the relation already described in FIG. 6, the calculation of the sensor temperature T is, therefore, achieved easily as a function of the heater resistance. Subsequently, the routine proceeds to step S4 wherein the diagnosis threshold Tth is determined for the diagnosis of the mounted condition. The determination of the diagnosis threshold Tth may be made in sequence of steps illustrated in FIG. 10.

Figure 10:
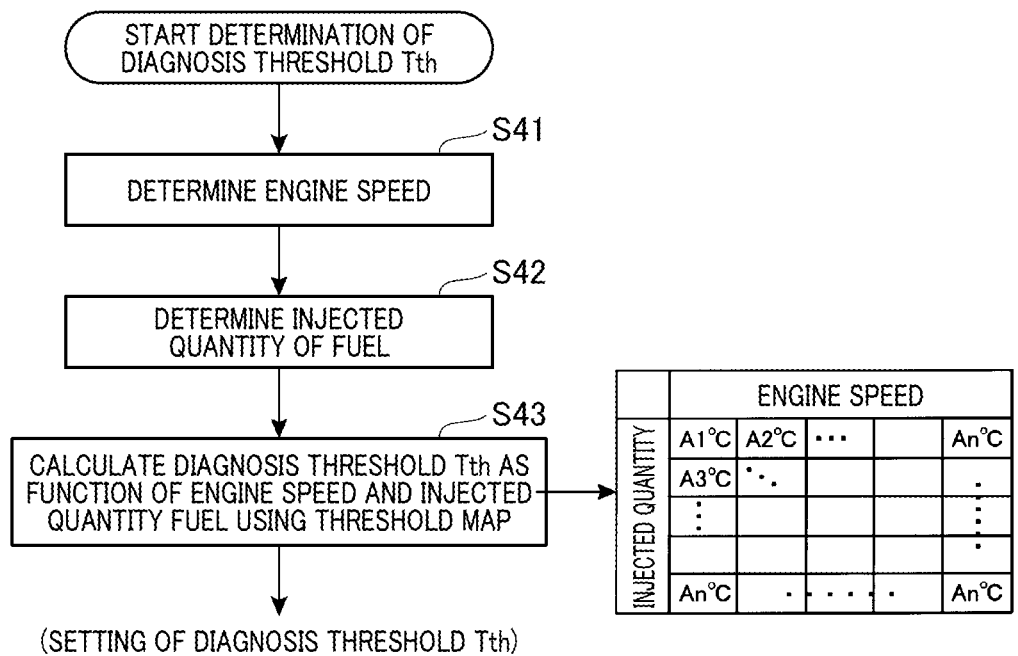
FIG. 10 is a flowchart of a diagnosis threshold setting operation performed by a diagnosis threshold setting unit of a mounted condition diagnosis unit in the first embodiment.

In FIG. 10, upon start of determination of the diagnosis threshold Tth, the routine proceeds to step S41 wherein the engine speed that is one of pieces of information about current operating conditions of the engine ENG is determined. The routine proceeds to step S42 wherein an injected quantity of fuel that is a second one of the pieces of information about the current operating conditions of the engine ENG is determined. The engine speed and the injected quantity of fuel may be determined or calculated using information inputted from various sensors to the operating condition detecting unit 5 of the ECU 30.

The routine proceeds to step S43 wherein the diagnosis threshold Tth is determined as a function of the engine speed and the injected quantity of fuel derived in steps S41 and S42. Specifically, a threshold map illustrated in FIG. 10 is experimentally prepared in advance. A temperature value (e.g., A1, A2, A3, or An° C. in the drawing) corresponding to the engine speed and the injected quantity of fuel derived in steps S41 and S42 is obtained by look-up using the threshold map and determined as the diagnosis threshold Tth. The threshold map is made using two parameters: the engine speed and the injected quantity of fuel, but however, the diagnosis threshold Tth may alternatively be selected using only one of the engine speed and the injected quantity of fuel.

Figure 11:
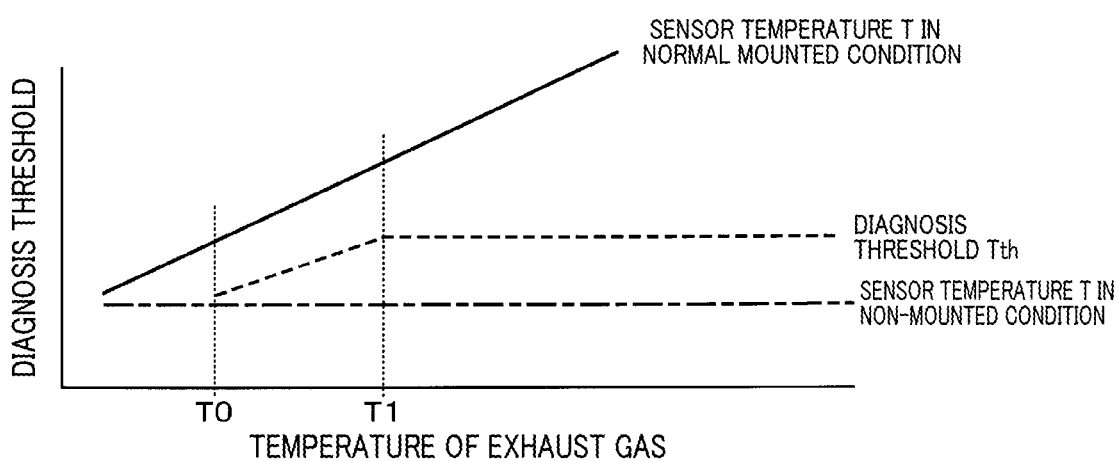
FIG. 11 is a view which represents a relation among a temperature of exhaust gas, a sensor temperature, and a diagnosis threshold for use in a diagnosis threshold setting unit of a mounted condition diagnosis unit in the first embodiment.

Usually, when the sensor body S1 is properly mounted, the temperature of exhaust gas and the sensor temperature T, as demonstrated in FIG. 11, bear a proportional relation. A rise in temperature of the exhaust gas will result in a rise in temperature of the sensor device 1 exposed to the exhaust gas (i.e., the sensor temperature T when the sensor device 1 is properly or normally mounted, as demonstrated in FIG. 11). In contrast, when the sensor body S1 is not mounted in place, for example, the sensor body S1 is removed from the exhaust pipe 101, a rise in temperature of the exhaust gas will not affect the sensor device 1, so that the sensor temperature T is substantially kept constant (i.e., the value of the sensor temperature T shown in FIG. 11 when the sensor body S1 is not mounted in the exhaust pipe 101, which will also be referred to as a non-mounted condition).

The diagnosis threshold Tth for use in diagnosing whether the sensor device 1 is properly mounted is, therefore, determined as a function of the sensor temperature T which will change with a change in temperature of the exhaust gas when the sensor device 1 is viewed as being properly mounted. The temperature of exhaust gas may be calculated using the operating conditions of the engine ENG. Accordingly, the value of the sensor temperature T is calculated which corresponds to the temperature of exhaust gas flowing near the sensor body S1 which usually depends upon the operating condition of the engine ENG in the diagnosis operation. A temperature value lower than the calculated value of the sensor temperature T is determined as the diagnosis threshold Tth. It is advisable that the temperature value be determined to be smaller than a lower limit of a variation in the sensor temperature T which is usually expected in the normally mounted condition.

Specifically, the temperature of exhaust gas is, as shown in FIG. 12, proportional to the engine speed and the injected quantity of fuel. An increase in engine speed or injected quantity of fuel will results in an increase in temperature of the exhaust gas. It is, therefore, preferable that a relation of the engine speed or the injected quantity of fuel with the temperature of exhaust gas and a relation of the temperature of exhaust gas with the sensor temperature T be experimentally derived, and that a temperature value which may be used in determination that the sensor device 1 is not mounted be set to the diagnosis threshold Tth. The table illustrated in FIG. 10 which is associated with the engine speed and the injected quantity of fuel may be stored as a threshold map in a memory of the ECU 30.

It is also advisable that the mounted-condition diagnosis be inhibited from being performed in a range where the temperature of exhaust gas flowing in the exhaust pipe 101 is, as illustrated in FIG. 11, low because a difference in sensor temperature T between when the sensor body S1 is properly mounted and when it is not mounted in the exhaust pipe 101 is small. Specifically, the diagnosis threshold Tth is inhibited from being set until a given operating condition of the engine ENG is reached which corresponds to a lower limit temperature T0 set to a temperature of the exhaust gas above which the difference in sensor temperature T is larger than a given value. In the range where the temperature of exhaust gas is higher than or equal to the lower limit temperature T0, the diagnosis threshold Tth is preferably determined to be much lower than the value of the sensor temperature T in the normally mounted condition and equal to or higher than the value of the sensor temperature T in the non-mounted condition.

It is also advisable that the diagnosis threshold Tth be selected to be higher as the temperature of exhaust gas rises. The value of the sensor temperature T in the normally mounted condition is, as can be seen in upper and lower portions of FIG. 13, substantially equal to the temperature of exhaust gas, as calculated as a function of the operating condition, but it becomes lower than the temperature of exhaust gas in the presence of the mount error. The abnormality detection may, therefore, be achieved by selecting the value of the diagnosis threshold Tth to be lower than the temperature of exhaust gas and higher than the sensor temperature T both in a high temperature range and in a low temperature range of the temperature of exhaust gas. The value of the sensor temperature T in the presence of the mount error is substantially kept constant. A difference between the temperature of exhaust gas and the sensor temperature T in the low exhaust gas temperature range is usually smaller than that in the high exhaust gas temperature range. The highly accurate abnormality detection may, therefore, be accomplished as a function of the temperature of exhaust gas by selecting the diagnosis threshold Tth in the low exhaust gas temperature range to be lower than that in the high exhaust gas temperature range.

The highly accurate diagnosis of the mounted condition may, therefore, be achieved by determining the diagnosis threshold Tth as a function of the operating condition in each of the high temperature range and the low temperature range of the temperature of exhaust gas and the sensor temperature T. The diagnosis threshold Tth may be kept constant, as illustrated in FIG. 11, in a range where the temperature of exhaust gas is higher than or equal to a first temperature T1. The first temperature T1 is determined to be a temperature of exhaust gas intermediate between the value of the sensor temperature T in the normally mounted condition and the value of the sensor temperature T in the non-mounted condition. In other words, the diagnosis threshold Tth in the above range may be kept at a constant upper limit for use in the diagnosis of the mounted condition.

The mounted condition diagnosis unit 3 in this embodiment is, as described above, designed to facilitate the ease with which a determination of whether the mount error is present by using the diagnosis threshold Tth, as determined as a function of the operating condition in the diagnosis threshold setting unit 31, in comparison with the sensor temperature T, as determined by the sensor temperature determining unit 2, in the mount error determining unit 32. The sensor temperature T may be derived as a function of a resistance value of the heater 4 built in the sensor device 1. The diagnosis threshold Tth may be determined using the operating information. This eliminates the need for directly measuring the temperature of exhaust gas or calculating a difference between the sensor temperature T and the temperature of exhaust gas. The diagnosis availability determining unit 33 is used in the diagnosis of the mounted condition only when the correct diagnosis is available, thereby minimizing an error in the diagnosis.

Second Embodiment

Figure 14:
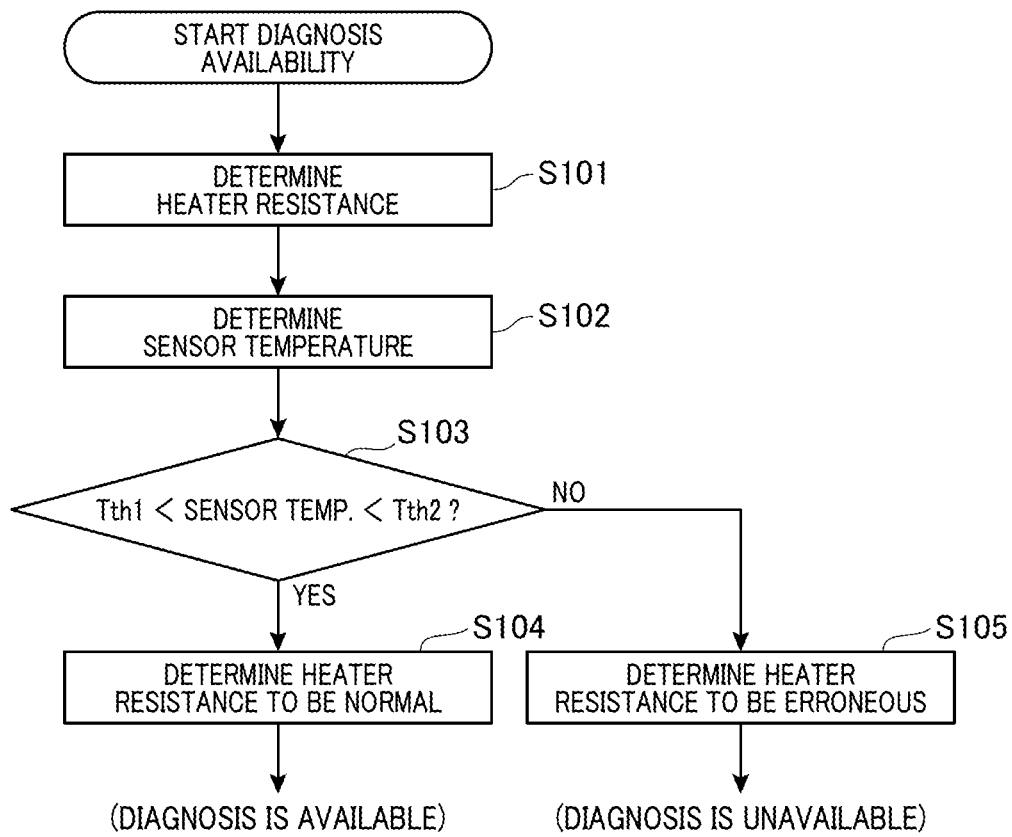
FIG. 14 is a flowchart of a diagnosis availability determining operation performed by a diagnosis availability determining unit of a mounted condition diagnosis unit according to the second embodiment.
Figure 15:
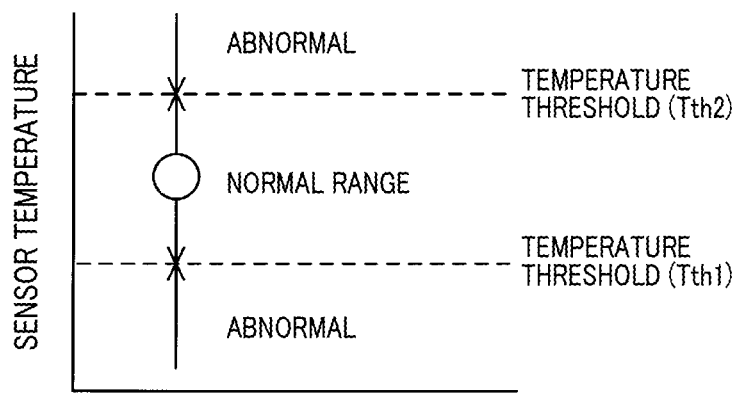
FIG. 15 is a view which represents a relation a normal range of a sensor temperature and a temperature threshold for use in a diagnosis availability determining unit of a mounted condition diagnosis unit in the second embodiment.

The particulate matter detecting apparatus 1 according to the second embodiment will be described below with reference to FIGS. 14 and 15.

This embodiment is a modification of a sequence of decision steps performed by the diagnosis availability determining unit 33 of the mounted condition diagnosis unit 3. The structure of the particulate matter detecting apparatus 1 is substantially identical with that in the first embodiment. The following discussion will refer only to differences from the first embodiment.

Reference symbols used in the second and following embodiments which are the same as those in the already described embodiment(s) will refer the same parts unless otherwise specified.

The diagnosis availability determining unit 33 in the first embodiment uses the heater resistance as information representing the operating condition of the sensor temperature determining unit 2. The heater resistance is, as demonstrated in FIG. 6, proportional to the sensor temperature T, thus enabling a determination of whether the diagnosis is available to be made using the sensor temperature T. FIG. 14 shows the diagnosis availability determining operation performed by the diagnosis availability determining unit 33. First, in step S101, the heater resistance is, like in step S102 in FIG. 8, detected. The routine then proceeds to step S102 wherein the sensor temperature T is calculated as a function of the heater resistance.

The routine proceeds to step S103 wherein the calculated sensor temperature T is compared with given temperature threshold values Tth1 and Tth2. Specifically, it is determined whether the calculated sensor temperature T lies in a normal range, as illustrated in FIG. 15, between the low temperature threshold value Tth1 and the upper temperature threshold value Tth2 (i.e., Tth1<heater resistance<Tth2). The temperature threshold values Tth1 and Tth2 may be determined as temperature values corresponding to the low resistance threshold value Rth1 and the upper resistance threshold value Rth2 discussed in FIG. 9.

If a YES answer is obtained in step S103, then the routine proceeds to step S104 wherein the sensor temperature T is determined to be proper. This means that the sensor temperature determining unit 2 is operating properly, so that it is possible to determine that the diagnosis of the mounted condition is properly available using a determined value of the sensor temperature T. Alternatively, if a NO answer is obtained in step S103, then the routine proceeds to step S105 wherein it is determined that the sensor temperature T is unusual or erroneous and that the sensor temperature determining unit 2 is not operating properly, thus meaning that it is impossible to properly diagnose the mounted condition.

This embodiment is capable of determining whether the diagnosis of the mounted condition is properly made. If an affirmative answer is obtained, the mounted-condition diagnosis continues to be performed in the same way as in the first embodiment.

Third Embodiment

The particulate matter detecting apparatus 1 in the third embodiment will be described below with reference to FIGS. 16 and 17.

This embodiment is a modification of a sequence of decision steps performed by the diagnosis availability determining unit 33 of the mounted condition diagnosis unit 3. The following discussion will refer only to differences from the above embodiments.

The diagnosis availability determining unit 33 in the first and second embodiments achieves a determination of whether the diagnosis is available using information representing the operating condition of the sensor temperature determining unit 2, but however, may alternatively use another information for such a determination. For instance, information about control impinging on the temperature of the sensor device 1 or the temperature of exhaust gas, such as information about a controlled condition of the sensor device 1 or a condition of exhaust gas flowing in the exhaust pipe 101 may be used.

Figure 16:
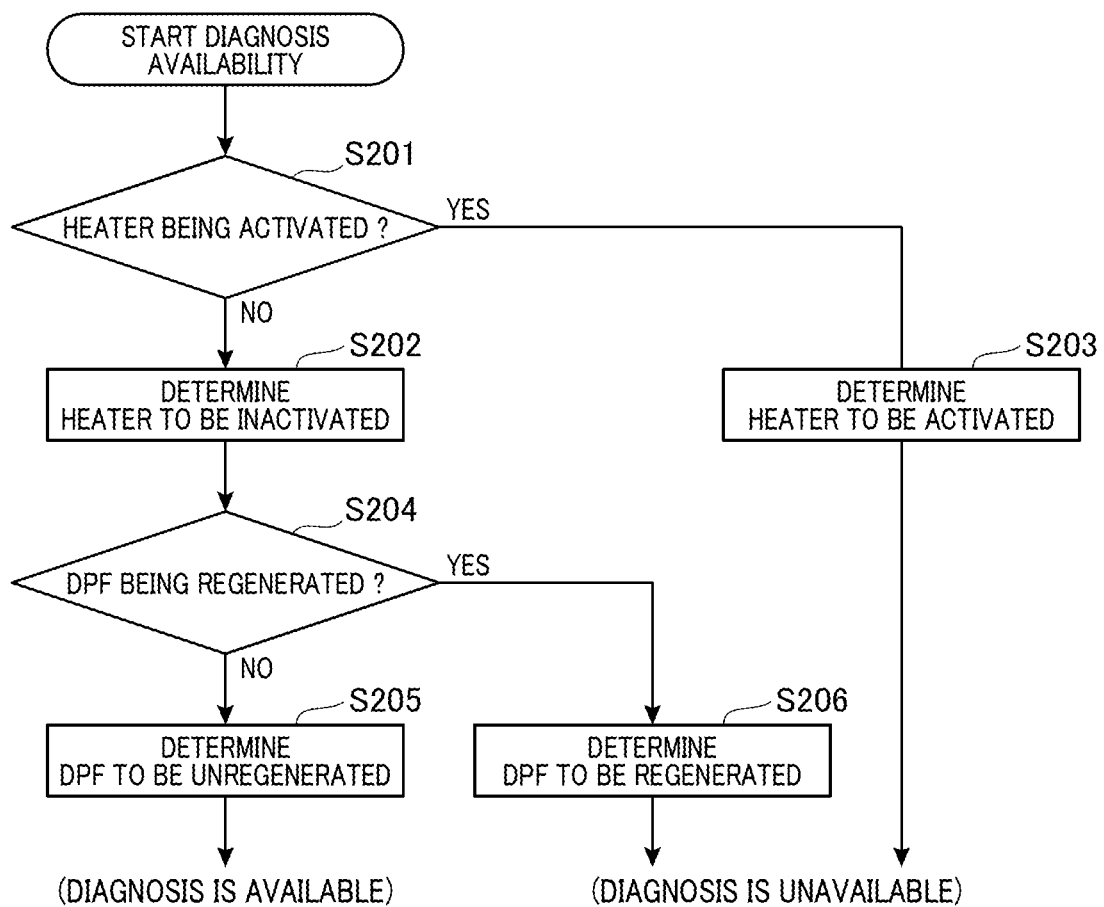
FIG. 16 is a flowchart of a diagnosis availability determining operation performed by a diagnosis availability determining unit of a mounted condition diagnosis unit according to the third embodiment.

This embodiment is, as shown in FIG. 16, designed to use the above pieces of information to achieve the operation of the diagnosis availability determining unit 33. The information about a controlled condition of the sensor device 1 includes information about heating control achieved by the heater 4 for the sensor device 1. The information about the condition of exhaust gas in the exhaust pipe 101 includes information about regenerating control for the DPF 102.

In FIG. 16, upon start of the diagnosis availability determination, the routine proceeds to step S201 wherein it is determined whether the operation of the heater 4 is being controlled, that is, the heater 4 is being activated to produce heat. If a NO answer is obtained, then the routine proceeds to step S202. Alternatively, if a YES answer is obtained in step S201, then the routine proceeds to step S203. In step S202, it is determined that the heater 4 is not activated, so that the heater 4 is having no effect on the sensor temperature T. The routine then proceeds to step S204. In step S203, it is determined that the sensor device 1 is being subjected to thermal energy produced by the heater 4, so that the value of the sensor temperature T is different from the temperature of exhaust gas, and that the diagnosis is not properly available. The mounted-condition diagnosis is, therefore, inhibited from being performed.

In step S204, it is determined whether the DPF 102 is now being controlled to be regenerated. If a NO answer is obtained in step S204, then the routine proceeds to step S204. Alternatively, if a YES answer is obtained in step S204, then the routine proceeds to step S206. In step S205, it is determined that the DPF 102 is not being regenerated, so that it has no effect on the sensor temperature T, and that the diagnosis of the mounted condition is properly available. In step S206, it is determined that PM deposited on the DPF 102 is being burned to regenerate the DPF 102, so that the temperature of exhaust gas is high where the sensor body S1 is mounted, and that there is a possibility that the mounted condition may be diagnosed in error. The mounted-condition diagnosis is inhibited from being performed.

Figure 17:
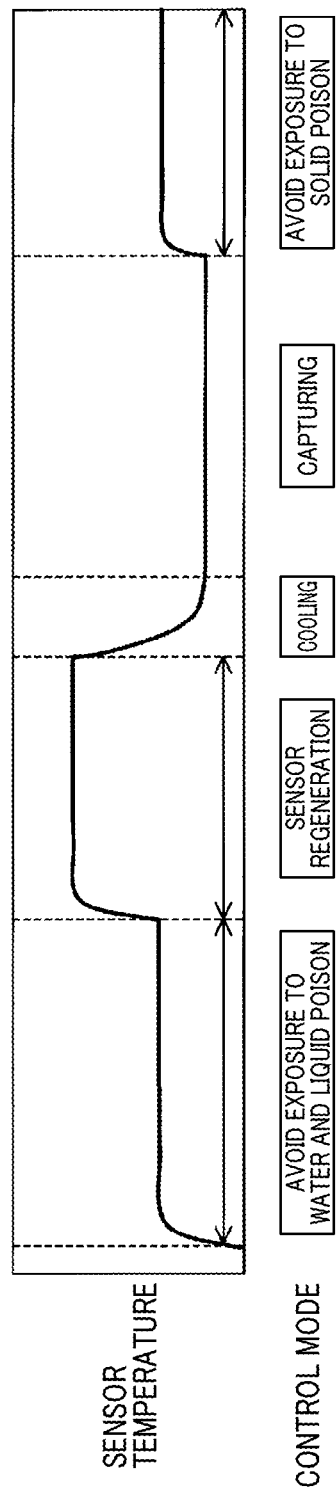
FIG. 17 is a view which represents a relation between a control mode of an engine and a sensor temperature for use in a diagnosis availability determining unit of a mounted condition diagnosis unit according to the third embodiment.

FIG. 17 demonstrates an example of a heating control operation of the heater controlling unit 21. For instance, immediately after the engine ENG is started, the sensitive portion 10 of the sensor device 1 is heated up to a temperature (e.g., 300° C. to 600° C.) at which condensed water will be shed, and liquid poisons will be reduced on the sensitive portion 10. Subsequently, the heater controlling unit 21 controls the operation of the heater 4 to increase the temperature of the sensitive portion 10 up to a temperature (e.g., 600° C. to 800° C.) at which the PM will be burned, and the ash will not be thermally adhered to the sensitive portion 10. The heater controlling unit 21 then turns off the heater 4 to cool the sensitive portion 10 to collect the PM. Afterwards, the heater controlling unit 21 controls the heater 4 to place the sensitive portion 10 at a temperature (higher than the temperature of exhaust gas) which develops the thermophoresis phenomenon to avoid adhesion of poisons to the sensitive portion 10. The above control mode in which the sensor device 1 is heated to a temperature higher than or equal to the temperature of exhaust gas eliminates a risk that an error in the mounted-condition diagnosis made using the sensor temperature T may occur.

Fourth Embodiment

The particulate matter detecting apparatus 1 in the fourth embodiment will be described below with reference to FIGS. 18 to 21.

This embodiment is a modification of a sequence of decision steps performed by the diagnosis availability determining unit 33 of the mounted condition diagnosis unit 3. Information about the operating condition of the engine ENG is used as information for use in the diagnosis availability determination. The following discussion will refer only to differences from the above embodiments.

Figure 18:
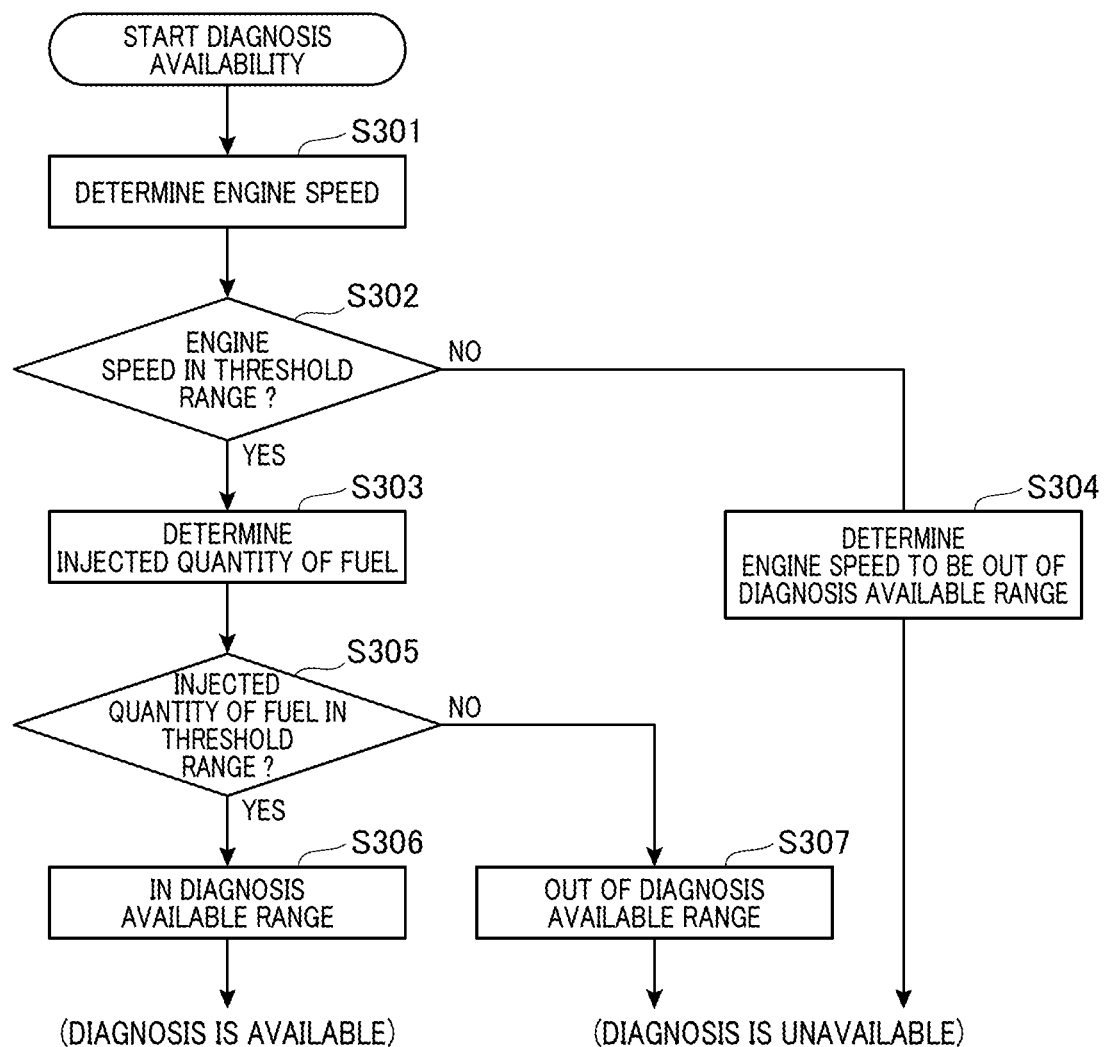
FIG. 18 is a flowchart of a diagnosis availability determining operation performed by a diagnosis availability determining unit of a mounted condition diagnosis unit according to the fourth embodiment.

In FIG. 18, upon start of the diagnosis availability determination, the routine proceeds to step S301 wherein the engine speed is determined as one of pieces of information about the operations of the engine ENG. The routine then proceeds to step S302 wherein it is determined whether the engine speed determined in step S301 lies in a given threshold range. Specifically, an upper threshold value and a lower threshold value which define a range of the engine speed suitable for the diagnosis of the mounted condition is, as illustrated in FIG. 19, derived in advance. It is determined in step S302 whether the engine speed is in the above range. If a YES answer is obtained in step S302 meaning that the engine speed is in a range in which the diagnosis is properly available, then the routine proceeds to step S303 wherein an injected quantity of fuel is determined as one of the pieces of information about the operations of the engine ENG. Alternatively, if a NO answer is obtained in step S302, then the routine proceeds to step S304 wherein it is determined that the engine speed is out of the range in which the diagnosis is properly available, and the mounted-condition diagnosis is inhibited from being performed.

After step S303, the routine proceeds to step S305 wherein it is determined whether the injected quantity of fuel derived in step S303 lies in a given threshold range. Specifically, an upper threshold value and a lower threshold value which define a range of the injected quantity of fuel suitable for the diagnosis of the mounted condition is, as illustrated in FIG. 19, derived in advance. It is determined in step S305 whether the injected quantity of fuel is in the above range. If a YES answer is obtained in step S305, then the routine proceeds to step S306 wherein it is determined that the injected quantity of fuel is in a range in which the diagnosis is properly available, in other words, permitted to be performed. The mounted-condition diagnosis, therefore, continues to be executed. Alternatively, if a NO answer is obtained in step S305, then the routine proceeds to step 307 wherein it is determined that the injected quantity of fuel is out of the range in which the diagnosis is properly available, and the mounted-condition diagnosis is inhibited from being performed.

It may alternatively be determined that the diagnosis is properly available, as demonstrated in FIG. 19, when the engine speed and the injected quantity of fuel are determined to be in ranges higher than or equal to lower threshold values without using upper threshold values. Usually, the temperature of exhaust gas is, as can be seen in FIG. 12, low in a range where the engine speed or the injected quantity of fuel is small, thus resulting in a decreased difference between the temperature of exhaust gas and the sensor temperature T. The execution of the diagnosis of the mounted condition when the engine speed and the injected quantity of fuel lie at least above the lower threshold values, therefore, improves the reliability of the mounted-condition diagnosis.

This embodiment uses the engine speed and the injected quantity of fuel as representing the operations of the engine ENG, but however, may determine the availability of the diagnosis only using one of the engine speed and the injected quantity. Alternatively, another information about, for example, the speed of the vehicle may be used as representing the operating condition of the engine ENG. A sequence of decision steps performed by the diagnosis availability determining unit 33 of the mounted condition diagnosis unit 3 using the speed of the vehicle is shown in FIG. 20.

In FIG. 20, upon start of the diagnosis availability determination, the routine proceeds to step S401 wherein the speed of the vehicle is determined as one of pieces of information about the operations of the engine ENG. The routine then proceeds to step S402 wherein it is determined whether the speed of the vehicle determined in step S401 lies in a given diagnosis permissible threshold range. Specifically, an upper threshold value and a lower threshold value which define a range of the speed of the vehicle suitable for the diagnosis of the mounted condition is, as illustrated in the drawing, derived. It is determined in step S402 whether the speed of the vehicle is in the above range. The availability of the diagnosis may alternatively be determined, like use of the engine speed and the injected quantity of fuel, based only on the lower threshold value around which the temperature of exhaust gas is usually low.

If a YES answer is obtained in step S402, then the routine proceeds to step S403 wherein the speed of the vehicle is determined to be in the diagnosis permissible threshold range, meaning that the diagnosis of the mounted condition is properly available. The mounted-condition diagnosis, therefore, continues to be performed. Alternatively, if a NO answer is obtained in step S402, then the routine proceeds to step S404 wherein it is determined that the speed of the vehicle is out of the diagnosis permissible threshold range in which the diagnosis is properly available, and the mounted-condition diagnosis is inhibited from being performed.

The temperature of exhaust gas in the exhaust pipe 101 may be used as information about the condition of the exhaust gas. A sequence of decision steps performed by the diagnosis availability determining unit 33 of the mounted condition diagnosis unit 3 using the temperature of exhaust gas is shown in FIG. 21.

In FIG. 21, upon start of the diagnosis availability determination, the routine proceeds to step S501 wherein the temperature of exhaust gas flowing in the exhaust pipe 101 is measured by the temperature sensor 103 located downstream of the DPF 102. Instead of use of the output from the temperature sensor 103, the temperature of exhaust gas may alternatively be determined as a function of an operating condition of the engine ENG. It is also not necessarily required to measure the temperature of exhaust gas in the vicinity of the location of the sensor body S1, but however, the temperature sensor 103 may alternatively be installed at a location different from the one as described above.

The routine then proceeds to step S502 wherein it is determined whether the temperature of exhaust gas determined in step S501 lies in a given diagnosis permissible threshold range. Specifically, an upper threshold value and a lower threshold value which define a range of the temperature of exhaust gas suitable for the diagnosis of the mounted condition is, as illustrated in the drawing, derived. It is determined in step S502 whether the temperature of exhaust gas is in the above range. The availability of the diagnosis may alternatively be determined based only on the lower threshold value around which the temperature of exhaust gas is usually low.

If a YES answer is obtained in step S502, then the routine proceeds to step S503 wherein the temperature of exhaust gas is determined to be in the diagnosis permissible threshold range, meaning that the diagnosis of the mounted condition is properly available. The mounted-condition diagnosis, therefore, continues to be performed. Alternatively, if a NO answer is obtained in step S502, then the routine proceeds to step S504 wherein it is determined that the temperature of exhaust gas is out of the diagnosis permissible threshold range in which the diagnosis is properly available, and the mounted-condition diagnosis is inhibited from being performed.

When the temperature of exhaust gas is low, it will result in a decreased difference in temperature between inside and outside the exhaust pipe 101, which may lead to a risk that the mounted condition may be diagnosed inaccurately. The diagnosis availability determination may, therefore, be made in advance using the temperature of air outside the exhaust pipe 101 to ensure the accuracy in the mounted-condition diagnosis.

Fifth Embodiment

The particulate matter detecting apparatus 1 in the fifth embodiment will be described below with reference to FIGS. 22 and 23.

This embodiment is a modification of a sequence of setting steps performed by the diagnosis threshold setting unit 31 of the mounted condition diagnosis unit 3 and designed to execute a correction operation using the temperature of outside air as information about an external factor. The structure of the particulate matter detecting apparatus 1 is substantially identical with that in the first embodiment. The following discussion will refer only to differences from the first embodiment.

Figure 22:
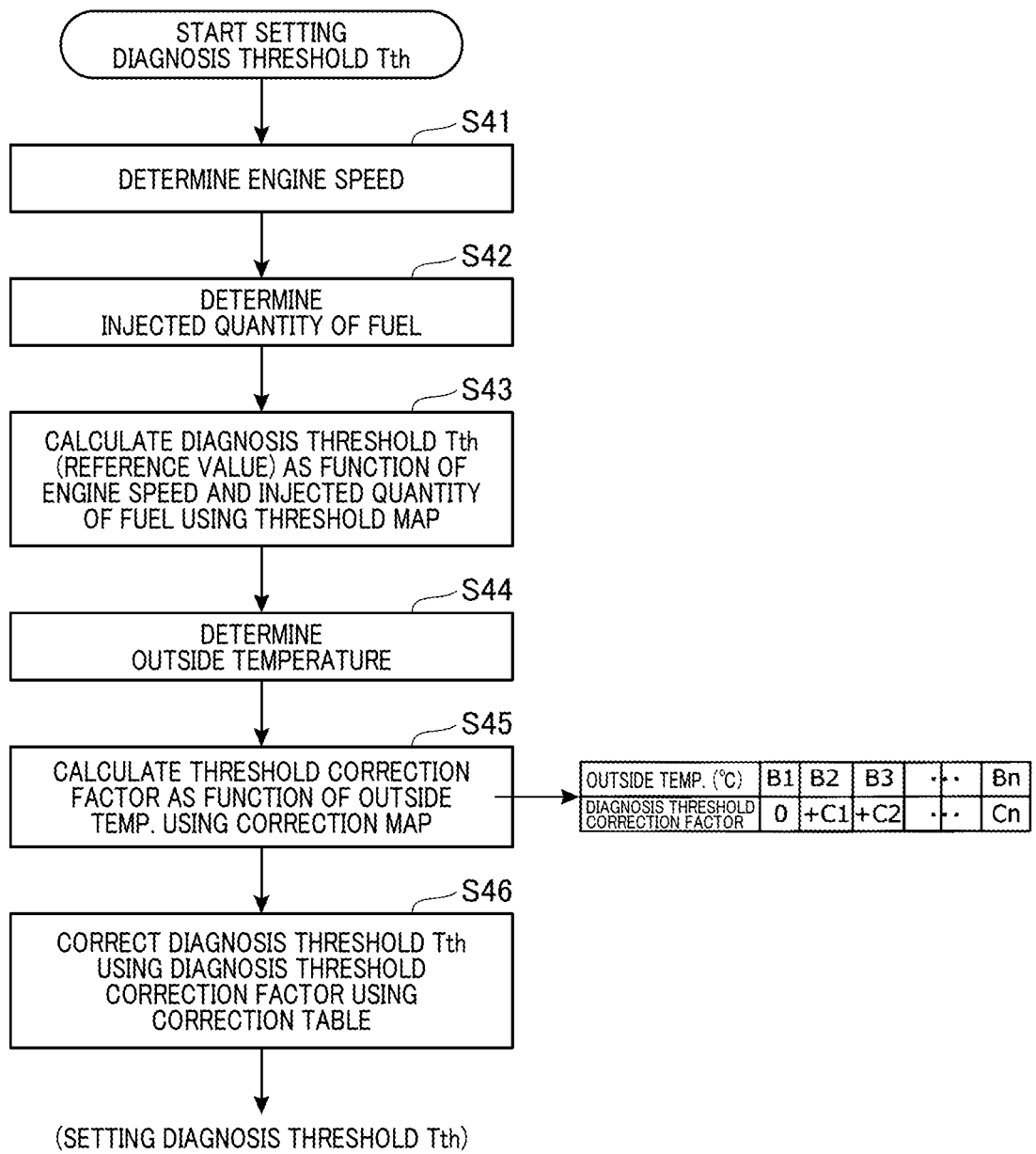
FIG. 22 is a flowchart of a diagnosis threshold setting operation performed by a diagnosis threshold setting unit of a mounted condition diagnosis unit according to the fifth embodiment.

Steps S41 to S43 in FIG. 22 are identical in operation with steps S41 to S43 in FIG. 10. Upon start of determination of the diagnosis threshold Tth, the routine proceeds to step S41 wherein the engine speed that is one of the pieces of information about current operating conditions of the engine ENG is determined. The routine proceeds to step S42 wherein an injected quantity of fuel is determined. The routine proceeds to step S43 wherein the diagnosis threshold Tth (i.e., a reference value) is determined as a function of the engine speed and the injected quantity of fuel derived in steps S41 and S42. Specifically, the diagnosis threshold Tth is determined as a function of the engine speed and the injected quantity of fuel by look-up using the threshold map illustrated in FIG. 10.

The routine then proceeds to step S44 wherein the temperature of outside air is measured. The routine proceeds to step S45 wherein a diagnosis threshold correction factor is determined as a function of the temperature of outside air using a prepared correction table. The routine proceeds to step S46 wherein the diagnosis threshold correction factor determined in step S43 is used to correct the diagnosis threshold Tth (i.e., the reference value). The corrected value of the diagnosis threshold Tth is used as a set value in the mounted-condition diagnosis.

Figure 23:
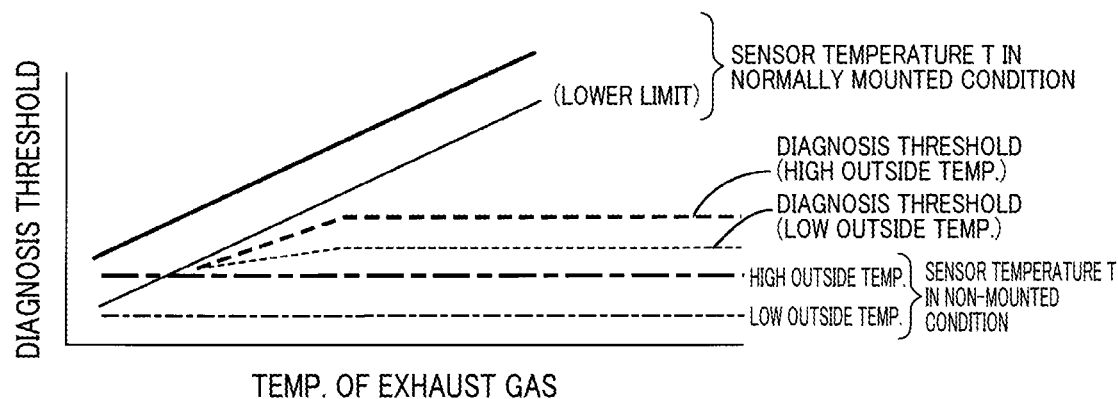
FIG. 23 is a view which represents relations between a temperature of exhaust gas and a diagnosis threshold and between a sensor temperature and a diagnosis threshold between a high outside temperature and a low outside temperature for use in a diagnosis threshold setting unit of a mounted condition diagnosis unit in the fifth embodiment.

Referring to FIG. 23, a change in temperature of outside air usually results in a change in sensor temperature T when the sensor body S1 is not mounted in the exhaust pipe 101 (i.e., the non-mounted condition). Particularly, a rise in temperature of outside air will result in a rise in sensor temperature T in the non-mounted condition, thereby resulting in a decreased difference in the sensor temperature T between the non-mounted condition and the normally mounted condition. The diagnosis threshold correction factor is, therefore, determined as a function of the temperature of outside air to increase the diagnosis threshold Tth when the temperature of outside air is high to be higher than that when the temperature of outside air is low. Such a correction factor is stored in the form of a correction table shown in FIG. 22 in a storage area of the ECU 30. For instance, when the temperature of outside air is higher than a given value, a value of the diagnosis threshold correction factor (e.g., 0, +C1, +C2, . . . or +Cn in the drawing) may be selected which corresponds to the temperature of outside air (e.g., B1, . . . or Bn° C.) and then added to the diagnosis threshold Tth (i.e. reference value).

Specifically, a relation among the temperature of outside air, the sensor temperature T in the non-mounted condition, the temperature of exhaust gas, and the sensor temperature T in the normally mounted condition is experimentally derived. An upper limit of the diagnosis threshold value Tth (i.e., a value of the diagnosis threshold value at a high outside temperature shown in FIG. 23) is preferably determined below a lower limit of a variation in sensor temperature T in the normally mounted condition. The diagnosis threshold correction factor, as determined as a function of the temperature of outside air, is added to the diagnosis threshold Tth (i.e., reference value) to have an updated value of the diagnosis threshold Tth (e.g., a value of the diagnosis threshold value at a low outside temperature shown in FIG. 23).

Figure 24:
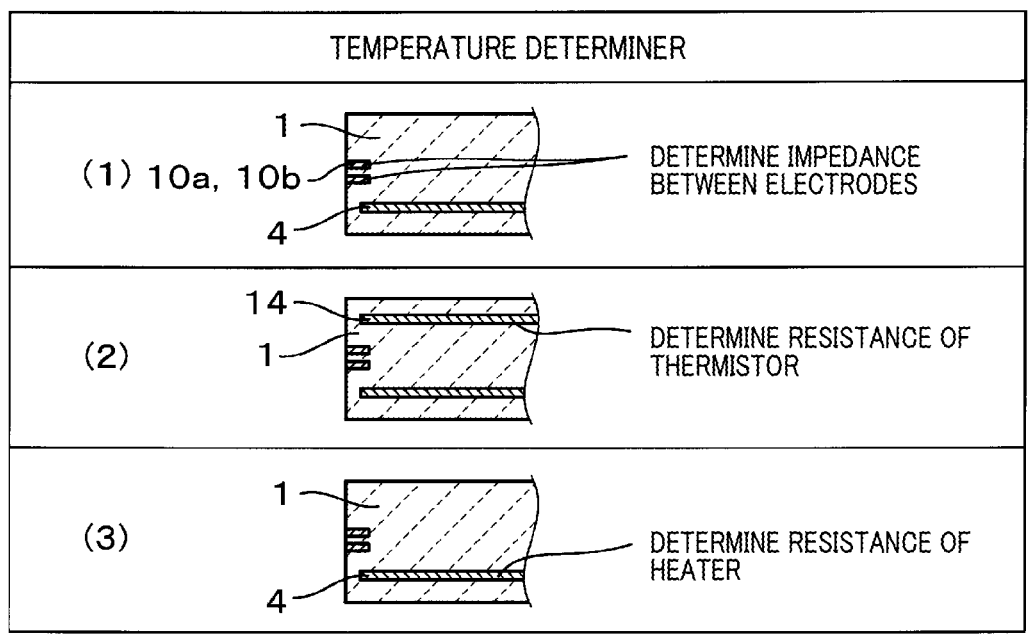
FIG. 24 is an enlarged view which illustrates highlights of a structure of a temperature measuring means used in a sensor temperature determining unit in a modification of the fifth embodiment.

In the above embodiments, the determination of the sensor temperature T in the sensor temperature determining unit 2 is achieved using the heater resistance of the heater 4 built in the sensor device 1, as illustrated in an example (3) of FIG. 24, but however, it may alternatively be made using another type of temperature determining means. For instance, an impedance between electrodes 10a and 10b, as illustrated in an example (1) in FIG. 24, constituting the sensitive portion 10 of the sensor device may be used to determine the sensor temperature T. Alternatively, the temperature determining thermistor 14 may be, as illustrated in an example (2) in FIG. 24, embedded in the sensor device 1. The sensor temperature T may be calculated in the sensor temperature determining unit 2 using a relation between the resistance of the thermistor 14 and the sensor temperature T.

While this disclosure has been shown in terms of the preferred embodiments, it should be appreciated that the disclosure is not limited to the structures of the embodiments without departing from the principle thereof. For example, the above embodiments are used with an engine exhaust emission control system including the DPF 102, but however, such a system including an engine may be modified as needed. The above embodiments may also be used to meet various requirements regardless of vehicles. The controller S2 of the particulate matter detecting apparatus S is designed to have the mounted condition diagnosis unit 3 installed in the SCU 20, however, the mounted condition diagnosis unit 3 may alternatively be installed in the vehicle ECU 30. The structure of the sensor body S1 or the sensor device 1 may be changed as needed.

What is claimed is:

1. A particulate matter detecting apparatus comprising:
a sensor body which has a sensor device which is retained in a housing configured to be secured to an exhaust pipe of an internal combustion engine and detects particulate matter contained in exhaust gas;
a sensor temperature determining unit which works to determine a temperature of the sensor device; and
a mounted condition diagnosis unit which diagnoses a mounted condition where the sensor body is mounted in the exhaust pipe, wherein
the mounted condition diagnosis unit includes a diagnosis threshold setting unit, a diagnosis threshold correcting unit, and a mount error determining unit, the diagnosis threshold setting unit determining a diagnosis threshold, as used in a diagnosis of the mounted condition, as a function of an operating condition of the internal combustion engine to have a temperature value lower than a temperature of the sensor device when the sensor body is normally mounted in the exhaust pipe,
the diagnosis threshold correcting unit works to correct the diagnosis threshold using information about an outside of the internal combustion engine, the diagnosis threshold being corrected to have a higher value as a temperature of outside air as the information of the outside becomes higher or a lower value as the temperature of outside air becomes lower,
the mount error determining unit compares a sensor temperature that is the temperature of the sensor device determined by the sensor temperature determining unit with the diagnosis threshold and, when the sensor temperature is lower than the diagnosis threshold, determines that an error in the mounted condition is occurring.

2. The particulate matter detecting apparatus as set forth in claim 1, wherein the diagnosis threshold setting unit determines at least one of an engine speed and an injected quantity of fuel as the operating condition of the internal combustion engine, and the diagnosis threshold is determined based on a relation the temperature of the sensor device in a normally mounted condition thereof and the operating condition of the internal combustion engine.

3. The particulate matter detecting apparatus as set forth in claim 1, wherein the sensor body is equipped with a heater which is electrically energized to heat the sensor device, and the sensor temperature determining unit determines the temperature of the temperature of the sensor device as a function of a resistance value of the heater.

4. The particulate matter detecting apparatus as set forth in claim 1, wherein the mounted condition diagnosis unit includes a diagnosis availability determining unit which determines whether a diagnosis of the mounted condition of the sensor body is properly available.

5. The particulate matter detecting apparatus as set forth in claim 4, wherein the diagnosis availability determining unit determines whether the diagnosis of the mounted condition of the sensor body is properly available using at least one of an operating condition of the sensor temperature determining unit, a controlled condition of the sensor device, a condition of the exhaust gas in the exhaust pipe, and the operating condition of the internal combustion engine.

6. The particulate matter detecting apparatus as set forth in claim 5, wherein the diagnosis availability determining unit determines that the diagnosis of the mounted condition is properly unavailable when the sensor temperature determining unit fails in determining the temperature of the sensor device or the sensor device is being heated.

7. The particulate matter detecting apparatus as set forth in claim 5, wherein a filter which captures the particulate matter is disposed upstream of a location of the sensor body in a flow of the exhaust gas, and the diagnosis availability determining unit determines the diagnosis of the mounted condition is properly unavailable when the filter is placed in a regenerated condition as representing the condition of the exhaust gas in the exhaust pipe.

8. The particulate matter detecting apparatus as set forth in claim 1, wherein the diagnosis threshold setting unit calculates a reference value of the diagnosis threshold based on the operating condition of the internal combustion engine, and the diagnosis threshold correcting unit works to correct the reference value using a diagnosis threshold correction factor derived based on the information about the outside to set the diagnosis threshold.

\* \* \* \* \*